US010414981B2

(12) United States Patent
Chen et al.

(10) Patent No.: US 10,414,981 B2
(45) Date of Patent: Sep. 17, 2019

(54) LIQUID CRYSTAL COMPOSITION CONTAINING 2-METHYL-3,4,5-TRIFLUOROBENZENE LIQUID CRYSTAL COMPOUND AND APPLICATION THEREOF

(71) Applicant: BEIJING BAYI SPACE LCD TECHNOLOGY CO., LTD, Beijing (CN)

(72) Inventors: Maoxian Chen, Beijing (CN); Haiguang Chen, Beijing (CN); Shihong Chu, Beijing (CN); Xin Wei, Beijing (CN); Xinying Wang, Beijing (CN); Tianmeng Jiang, Beijing (CN); Huiqiang Tian, Beijing (CN); Yunpeng Guo, Beijing (CN); Lin Zhang, Beijing (CN); Qinghua Li, Beijing (CN); Jin Yuan, Beijing (CN); Xuehui Su, Beijing (CN)

(73) Assignee: BEIJING BAYI SPACE LCD TECHNOLOGY CO., LTD, Beijing (CN)

( * ) Notice: Subject to any disclaimer, the term of this patent is extended or adjusted under 35 U.S.C. 154(b) by 36 days.

(21) Appl. No.: 15/536,082

(22) PCT Filed: Oct. 23, 2015

(86) PCT No.: PCT/CN2015/092665
§ 371 (c)(1),
(2) Date: Jun. 14, 2017

(87) PCT Pub. No.: WO2016/115928
PCT Pub. Date: Jul. 28, 2016

(65) Prior Publication Data
US 2017/0335189 A1 Nov. 23, 2017

(30) Foreign Application Priority Data
Jan. 21, 2015 (CN) .......................... 2015 1 0030582

(51) Int. Cl.
*G02F 1/1333* (2006.01)
*C09K 19/30* (2006.01)
(Continued)

(52) U.S. Cl.
CPC ...... *C09K 19/3066* (2013.01); *C09K 19/0403* (2013.01); *C09K 19/12* (2013.01); *C09K 19/126* (2013.01); *C09K 19/20* (2013.01); *C09K 19/3003* (2013.01); *C09K 19/3402* (2013.01); *C09K 19/44* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01);
(Continued)

(58) Field of Classification Search
CPC ............ C09K 19/3066; C09K 19/0403; C09K 19/12; C09K 19/126; C09K 19/20; C09K 19/3003; C09K 19/3402; C09K 19/44; C09K 2019/0466; C09K 2019/122; C09K 2019/123; C09K 2019/124; C09K 2019/3004; C09K 2019/3009; C09K 2019/301; C09K 2019/3016; C09K 2019/3019; C09K 2019/3021; C09K 2019/3025; C09K 2019/3422; G02F 1/1333; G02F 1/1368
USPC .................................................... 252/299.61
See application file for complete search history.

(56) References Cited

U.S. PATENT DOCUMENTS 8,197,709 B2 6/2012 Lietzau et al.
8,404,150 B2 3/2013 Wittek et al.
(Continued)

FOREIGN PATENT DOCUMENTS

CN 102050708 A 5/2011
CN 103351873 A 10/2013
(Continued)

OTHER PUBLICATIONS

International Search Report (in English and Chinese) and Written Opinion of the International Searching Authority (in Chinese) issued in PCT/CN2015/092665, dated Jan. 4, 2016; ISA/CN.
International Search Report (in English and Chinese) and Written Opinion of the International Searching Authority (in Chinese) issued in PCT/CN2015/095740, dated Jan. 19, 2016; ISA/CN.

*Primary Examiner* — Geraldina Visconti
(74) *Attorney, Agent, or Firm* — Harness, Dickey & Pierce, P.L.C.

(57) ABSTRACT

The present invention relates to the technical field of liquid crystal displays, and particularly relates to a liquid crystal composition containing a 2-methyl-3,4,5-trifluorobenzene liquid crystal compound and use thereof, wherein the liquid crystal composition of the present invention comprises, in percentages by weight, 1-50% of one or more compounds represented by general formula I and 10-70% of one or more compounds represented by general formula II, and may further comprise 0-30% of compounds represented by general formula III and/or 6-45% of one or more compounds represented by general formulas IV to XIII. The liquid crystal composition provided by the present invention has a low rotational viscosity and a large elastic constant, is presented as having a shorter response time, and can significantly improve the display effect of a liquid crystal display when applied to TN, IPS and FFS mode displays.

9 Claims, No Drawings

(51) Int. Cl.
*C09K 19/44* (2006.01)
*C09K 19/04* (2006.01)
*C09K 19/12* (2006.01)
*C09K 19/20* (2006.01)
*C09K 19/34* (2006.01)
*G02F 1/1368* (2006.01)

(52) U.S. Cl.
CPC ........... *C09K 2019/3019* (2013.01); *C09K 2019/3021* (2013.01); *C09K 2019/3025* (2013.01); *C09K 2019/3422* (2013.01); *G02F 1/1368* (2013.01)

(56) References Cited

U.S. PATENT DOCUMENTS

| | | | |
|---|---|---|---|
| 9,783,735 B2 * | 10/2017 | Kim | C09K 19/0403 |
| 2017/0349830 A1 * | 12/2017 | Jiang | G02F 1/1333 |
| 2018/0044592 A1 * | 2/2018 | Chen | G02F 1/1333 |

FOREIGN PATENT DOCUMENTS

| | | |
|---|---|---|
| CN | 103740377 A | 4/2014 |
| CN | 103937508 A | 7/2014 |
| CN | 104130781 A | 11/2014 |
| CN | 104774623 A | 7/2015 |
| WO | WO-2009100810 A1 | 8/2009 |

* cited by examiner

US 10,414,981 B2

LIQUID CRYSTAL COMPOSITION CONTAINING 2-METHYL-3,4,5-TRIFLUOROBENZENE LIQUID CRYSTAL COMPOUND AND APPLICATION THEREOF

CROSS REFERENCE TO RELATED APPLICATIONS

This application is a U.S. National Phase Application under 35 U.S.C. 371 of International Application No. PCT/CN2015/092665 filed on Oct. 23, 2015 and published in Chinese as WO 2016/115928 on Jul. 28, 2016. This application claims priority to Chinese Patent Application No. 201510030582.2 filed Jan. 21, 2015. The entire disclosures of all of the above applications are incorporated herein by reference.

FIELD OF THE INVENTION

The present invention relates to the technical field of liquid crystal displays, and particularly relates to a liquid crystal composition containing a 2-methyl-3,4,5-trifluorobenzene liquid crystal compound and use thereof. In particular, the present invention provides a liquid crystal composition containing a liquid crystal compound in which 2-methyl-3,4,5-trifluorobenzene is linked to a difluoromethoxy bridge bond. The liquid crystal composition provided by the present invention has a fast response time, and is particularly suitable for TN/IPS/FFS-type liquid crystal display devices.

BACKGROUND OF THE INVENTION

Currently, liquid crystal has been widely applied in the information display field, and has also made some progress in optical communication applications (S. T. Wu, D. K. Yang. Reflective Liquid Crystal Displays. Wiley, 2001). In recent years, the application field of liquid crystal compounds has been significantly broadened to various types of display devices, electro-optical devices, electronic components, sensors and the like. Nematic liquid crystal compounds have been most widely used in flat panel displays, particularly in TFT active matrix systems.

Liquid crystal display has gone through a long path of development since the discovery of liquid crystals. In 1888, Friedrich Reinitzer, an Austrian botanist, discovered the first liquid crystal material, i.e., cholesteryl benzoate. Manguin invented a rubbing orientation method for producing a single domain liquid crystal and studying optical anisotropy in 1917. E. Bose established Swarm doctrine in 1909, which was supported by experiments of L. S. Ormstein and F. Zernike et al. (1918), and was later explained as statistical fluctuations by De Gennes. In 1933, G W. Oseen and H. Zocher founded continuum theory which was modified by F. C. Frank (1958). M. Born (1916) and K. Lichtennecker (1926) found and studied liquid crystal dielectric anisotropy. In 1932, W. Kast accordingly divided the nematic phase into two categories: positive and negative. In 1927, V. Freedericksz and V. Zolinao discovered that nematic liquid crystal would be deformed and present a voltage threshold (Freederichsz change) in an electric field or magnetic field. This discovery provides a basis for the fabrication of liquid crystal displays.

In 1968, R. Williams in Radio Corporation of America (RCA) found that nematic phase liquid crystals formed stripe domains and had a light scattering phenomenon in an electric field. G. H. Heilmeir then developed this into a dynamic scattering display mode, and made the first liquid crystal display (LCD) in the world. In the early 1970s, Helfrich and Schadt invented twisted-nematic (TN) principle. The combination of the TN photoelectric effect and integrated circuit made a display device (TN-LCD), which has opened up a broad application prospect for liquid crystals. Particularly since the seventies, due to the development of large-scale integrated circuits and liquid crystal materials, the application of liquid crystals has made a breakthrough development in terms of display. Super Twisted Nematic (STN) mode proposed successively by T. Scheffer et al. in 1983-1985 and an Active Matrix (AM) mode proposed by P. Brody in 1972 were re-adopted. Conventional TN-LCD technology has been developed into STN-LCD and TFT-LCD technologies. Although the number of STN scanning lines can reach 768 or greater, there are still problems, such as response speed, viewing angle and gray scale, when the temperature rises. Therefore, for a large area, high information content, color display, an active matrix display mode becomes the first choice. TFT-LCD has been widely used in direct-view televisions, large-screen projection televisions, computer terminal displays and certain military instrument displays. It is believed that TFT-LCD technology will have broader application prospects.

There are two types of "active matrix" including: 1. a metal oxide semiconductor (MOS) on a silicon wafer as a substrate; and 2. a thin film transistor (TFT) on a glass plate as a substrate.

Monocrystalline silicon as a substrate material limits the display size due to the fact that there were many problems occurring at junctions of each part of a display device or even a module assembly. Accordingly, the second type of thin film transistor is a promising active matrix type. The photoelectric effect utilized is generally the TN effect. A TFT includes a compound semiconductor, such as CdSe, or a TFT based on polycrystalline silicon or amorphous silicon.

Currently, the LCD product technologies have been well established and successfully solved technical problems regarding viewing angle, resolution, color saturation, brightness, etc., and the display performance thereof has been close to or superior to that of CRT displays. Large-size and small-to-medium-size LCDs have gradually dominated the flat panel displays in respective fields. However, due to the limitation of (the high viscosity of) the liquid crystal material itself, the response time becomes a principal factor affecting high-performance displays.

In particular, the response time of a liquid crystal is limited by the rotational viscosity γ1 and the elastic constant of the liquid crystal. Therefore, reducing the rotational viscosity of a liquid crystal composition and increasing the elastic constant have a significant effect on reducing the response time of the liquid crystal display and accelerating the response speed of the liquid crystal display.

SUMMARY OF THE INVENTION

An object of the present invention is to provide a liquid crystal composition and use thereof.

In order to achieve the above object, the following technical solution is specifically adopted:

a liquid crystal composition containing a 2-methyl-3,4,5-trifluorobenzene liquid crystal compound, comprising, in percentages by weight, 1-50% of one or more compounds represented by general formula I and 10-70% of one or more compounds represented by general formula II,

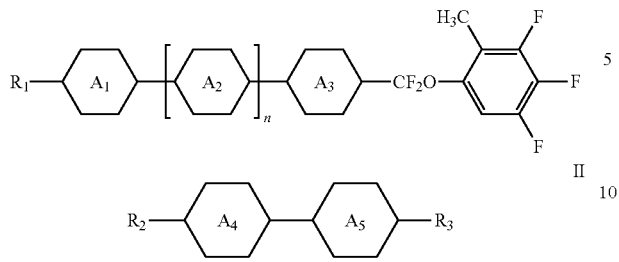

I

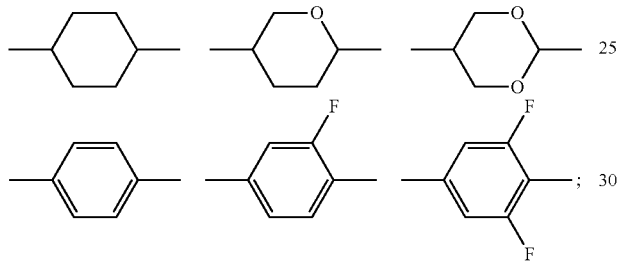

II wherein $R_1$, $R_2$ and $R_3$ each independently represent a $C_1$-$C_{12}$ linear alkyl group or a $C_1$-$C_{12}$ linear alkyl group having one or more non-adjacent $CH_2$ substituted with O, S or CH=CH;

n each independently represents 0 or 1;

$A_1$, $A_2$ and $A_3$ each independently represent the following structures:

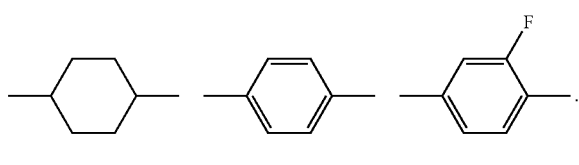

and $A_4$ and $A_5$ each independently represent a trans-1,4-cyclohexylene group or a 1,4-phenylene group.

The liquid crystal composition provided by the present invention has a low rotational viscosity and a large elastic constant, and is presented as having a shorter response time, so that the problem of the slow response of the liquid crystal display is effectively solved.

In order to achieve a fast response time, the liquid crystal composition of the present invention comprises, in percentages by weight, 3-20% of one or more compounds represented by general formula I, and 17-63% of one or more compounds represented by general formula II; or comprises 21-45% of one or more compounds represented by general formula I, and 20-45% of one or more compounds represented by general formula II.

The liquid crystal composition of the present invention further comprises 0-30% by weight of one or more compounds represented by general formula III, and preferably further comprises 2-30% by weight of one or more compounds represented by general formula III,

III

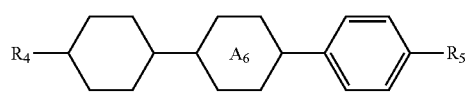

wherein $R_4$ and $R_5$ each independently represent a $C_1$-$C_{12}$ linear alkyl group or a $C_1$-$C_{12}$ linear alkyl group having one or more non-adjacent $CH_2$ substituted with O, S or CH=CH; and $A_6$ each independently represents the following structures:

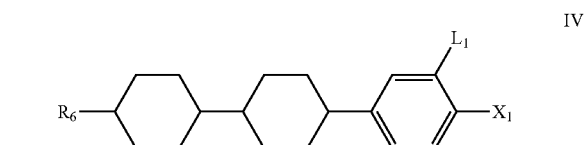

As a preferred technical solution of the present invention, the amount of one or more compounds represented by general formula III is 2-26% by weight.

The liquid crystal composition of the present invention further comprises 6-45% by weight of one or more compounds represented by general formulas IV to IX,

IV

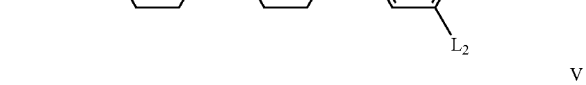

V

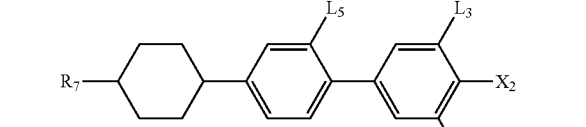

VI

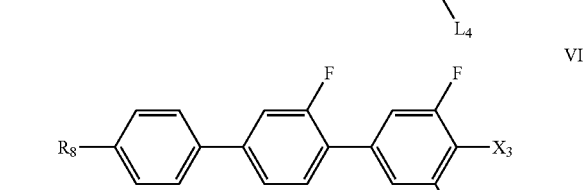

VII

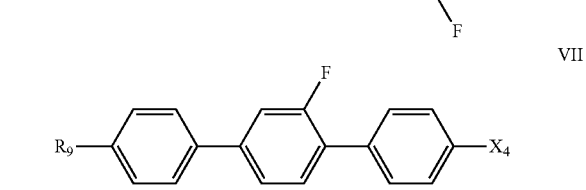

VIII

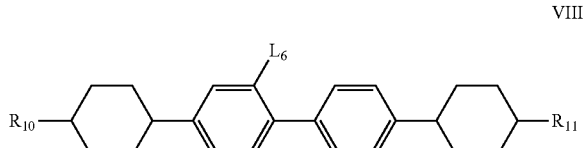

IX

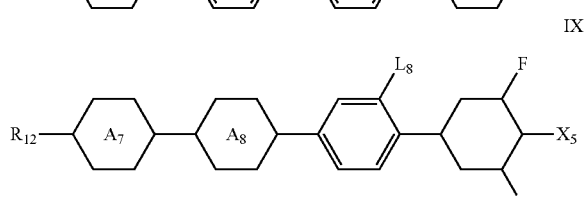

wherein $R_6$ and $R_9$ each independently represent a $C_1$-$C_{12}$ linear alkyl group or a $C_1$-$C_{12}$ linear alkyl group having one or more non-adjacent $CH_2$ substituted with CH=CH; $R_7$, $R_8$ and $R_{10}$-$R_{12}$ each independently represent a $C_1$-$C_{12}$ linear alkyl group; $L_1$-$L_8$ each independently represent H or F; and $X_1$-$X_3$ and $X_5$ each independently represent F, $CF_3$, $OCF_2H$ or $OCF_3$; $X_4$ each independently represents F, $CF_3$, $OCF_3$, and a $C_1$-$C_5$ linear alkyl group or a $C_2$-$C_5$ linear alkenyl group; and $A_7$ and $A_8$ are each independently selected from the following structures:

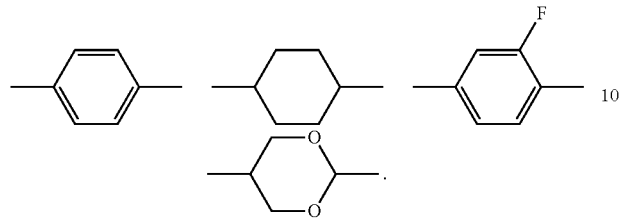

As a preferred technical solution of the present invention, the amount of one or more compounds represented by general formulas IV to IX is 28-37% by weight.

As an embodiment of the technical solution of the present invention, the liquid crystal composition of the present invention comprises, in percentages by weight, 6-39% of one or more compounds represented by general formula I, 22-62% of one or more compounds represented by general formula II, 2-26% of one or more compounds represented by general formula III, and 6-44% of one or more compounds represented by general formulas IV to IX.

Particularly, the compound represented by general formula I is selected from one or more of the compounds represented by formulas I-A to I-U:

I-A
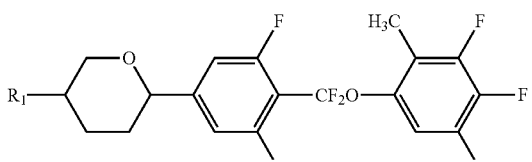

I-B
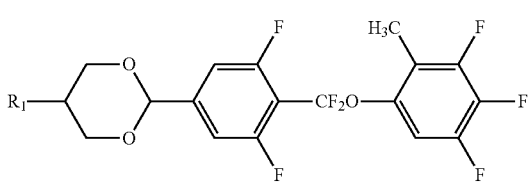

I-C
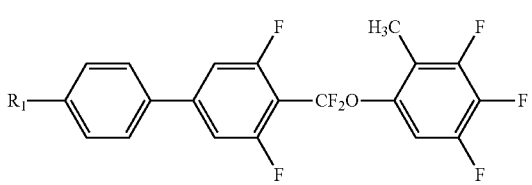

I-D
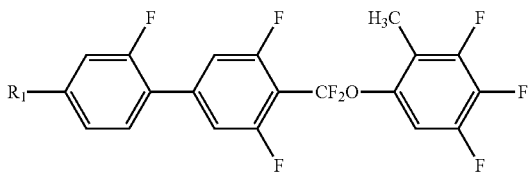

I-E
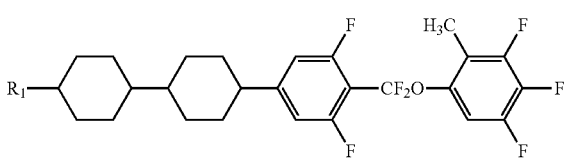

I-F

I-G

I-H

I-I
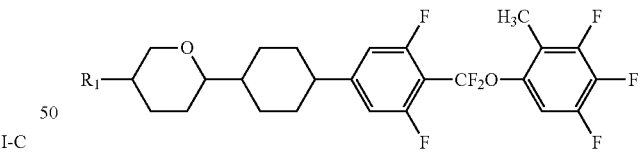

I-J

I-K
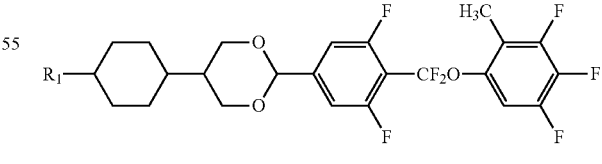

I-L
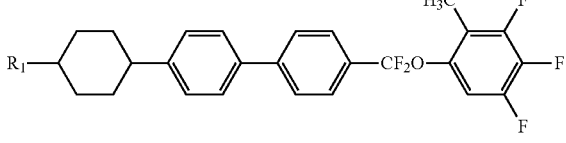

-continued

I-M
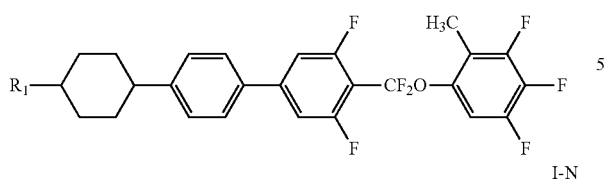

I-N
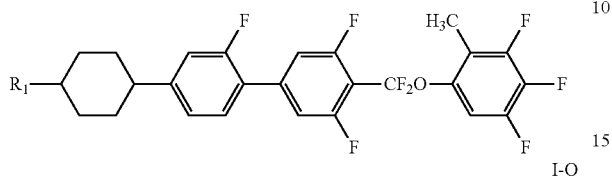

I-O
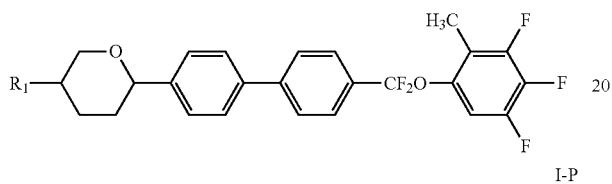

I-P
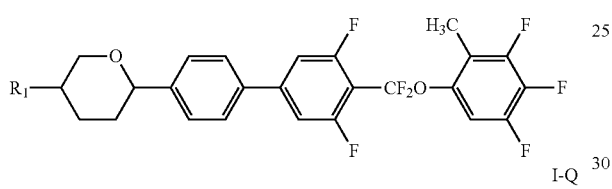

I-Q
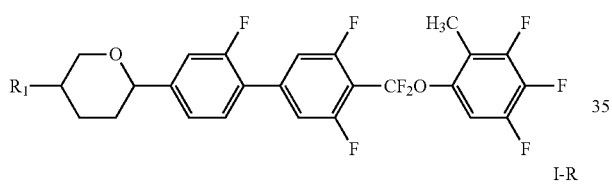

I-R
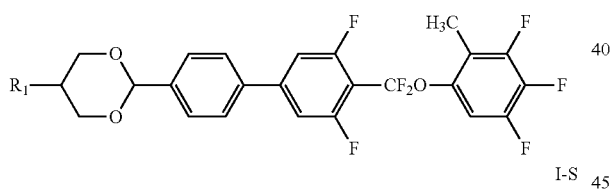

I-S
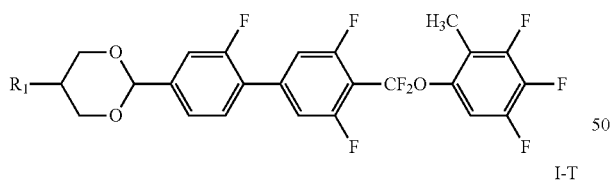

I-T
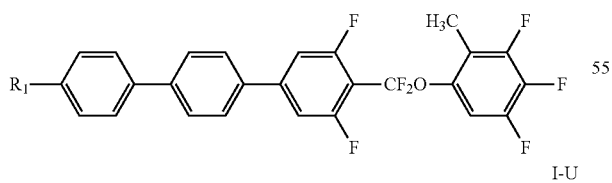

I-U
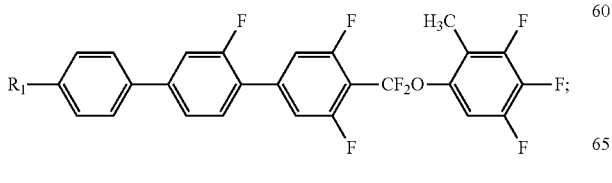

The compound represented by general formula II is selected from one or more of the following compounds:

II-A
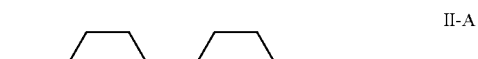

II-B
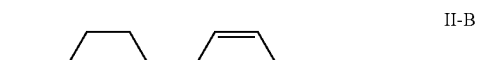

II-C
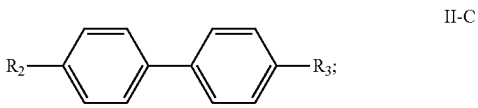

wherein $R_1$ each independently represents a $C_1$-$C_7$ linear alkyl group; $R_2$ each independently represents a $C_1$-$C_7$ linear alkyl group or linear alkoxy group or a $C_2$-$C_7$ linear alkenyl group; and $R_3$ each independently represents a $C_1$-$C_7$ linear alkyl group.

More particularly, the compound represented by general formula I is selected from one or more of the compounds represented by formulas I-A-1 to I-U-4:

I-A-1
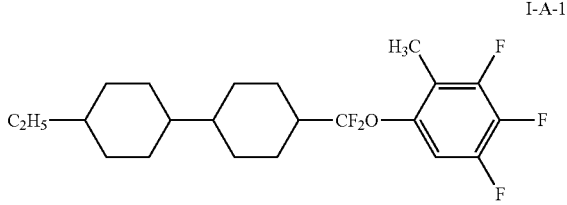

I-A-2
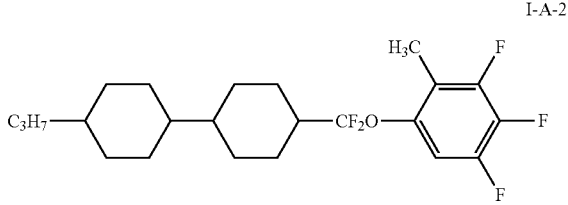

I-A-3
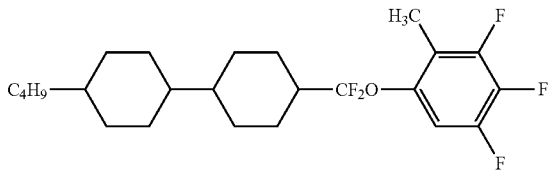

I-A-4
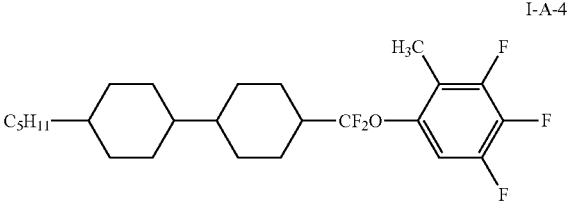

I-B-1
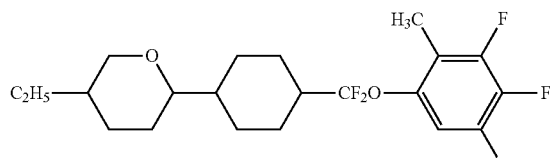
I-B-2
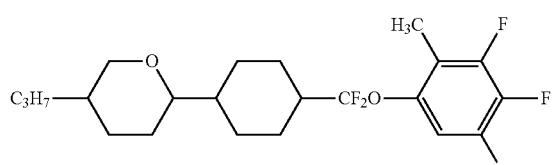
I-B-3
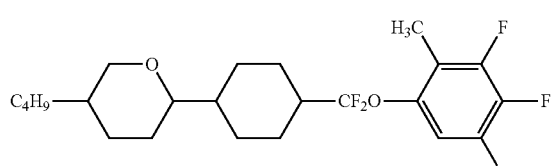
I-B-4
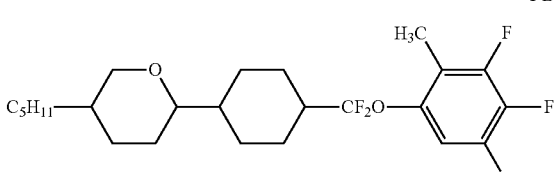
I-C-1
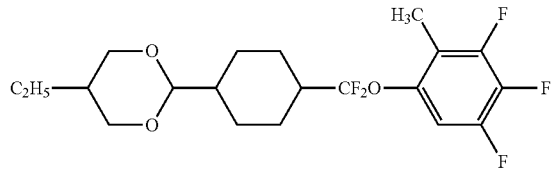
I-C-2
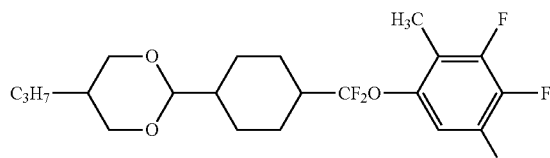
I-C-3
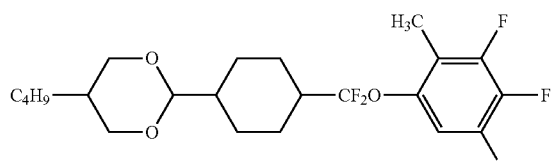
I-C-4
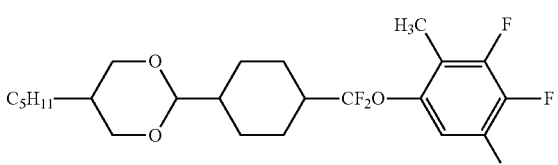
I-D-1
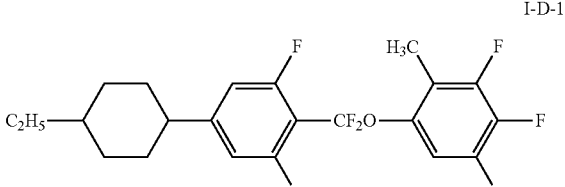
I-D-2
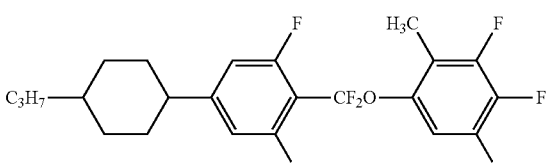
I-D-3
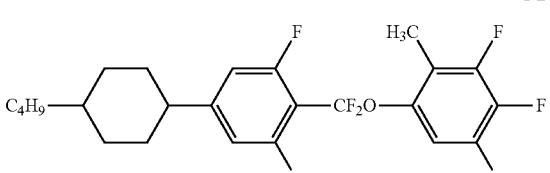
I-D-4
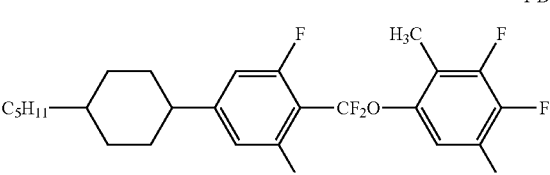
I-E-1
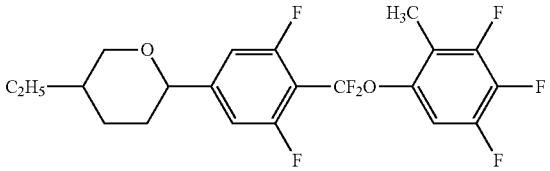
I-E-2
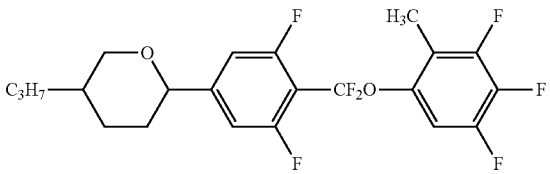
I-E-3
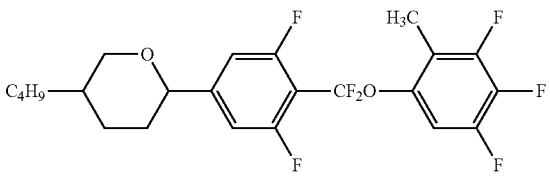
I-E-4
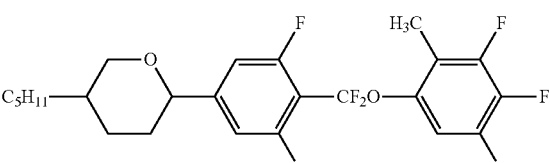

I-F-1 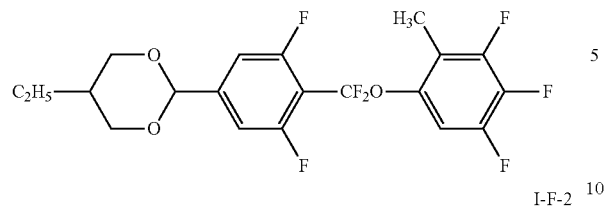
I-F-2 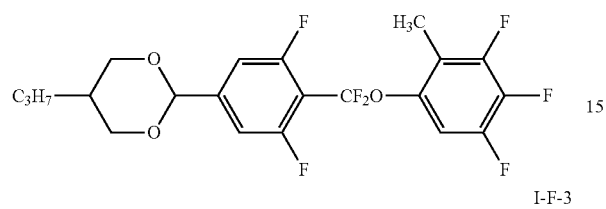
I-F-3 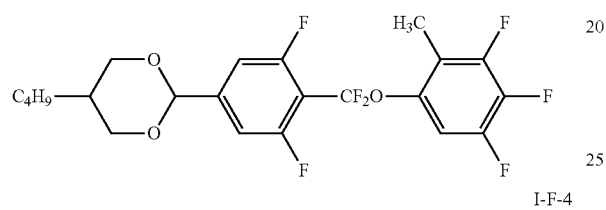
I-F-4 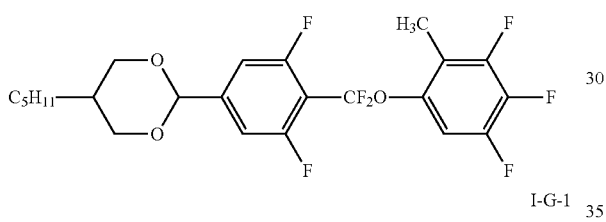
I-G-1 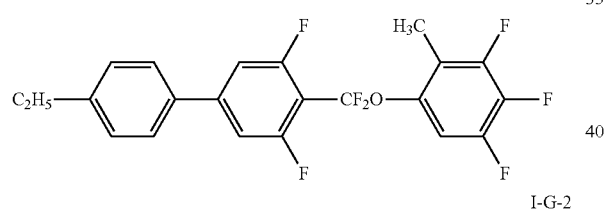
I-G-2 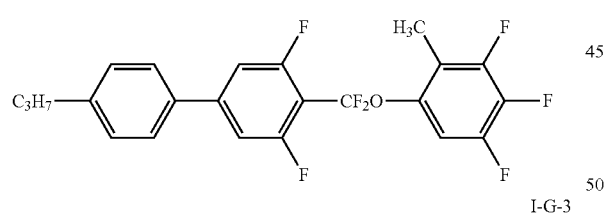
I-G-3 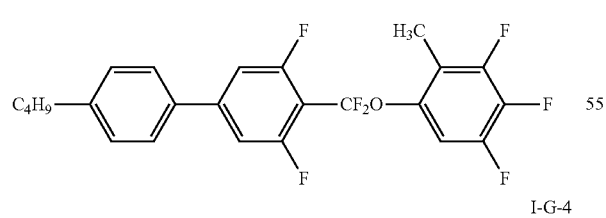
I-G-4 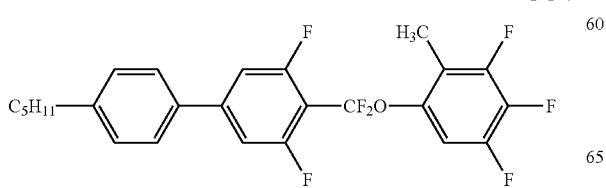
I-H-1 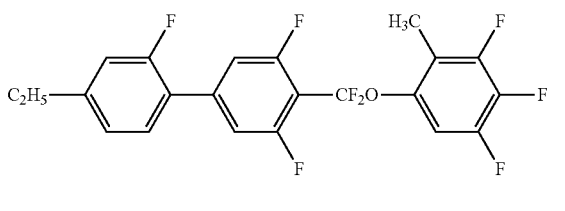
I-H-2 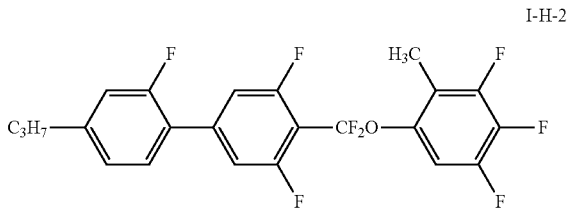
I-H-3 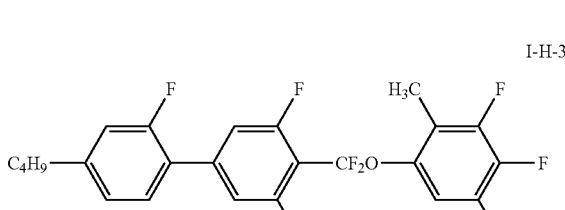
I-H-4 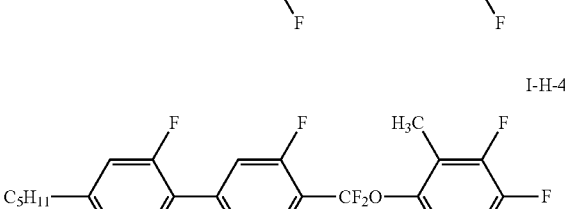
I-I-1 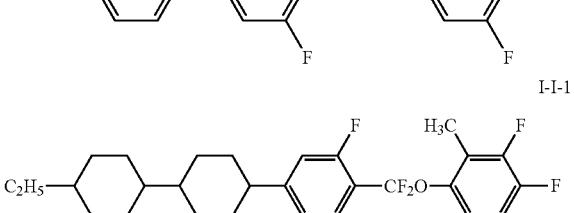
I-I-2 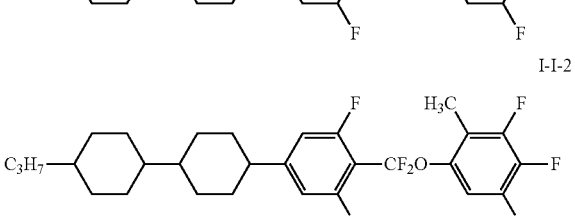
I-I-3 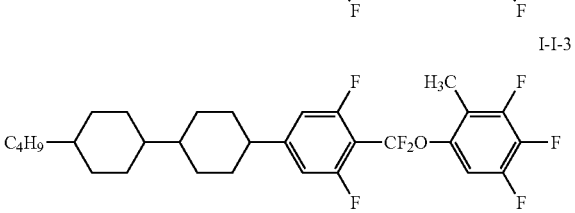
I-I-4 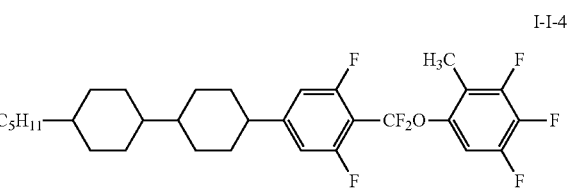

-continued

I-N-3
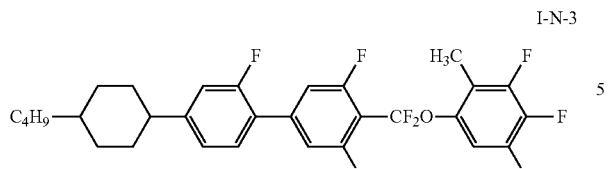
I-N-4
I-O-1
I-O-2
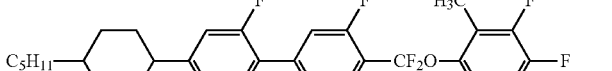
I-O-3
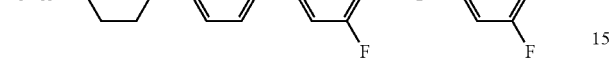
I-O-4
I-P-1
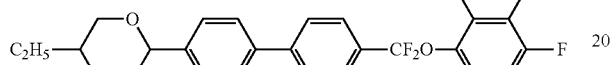
I-P-2
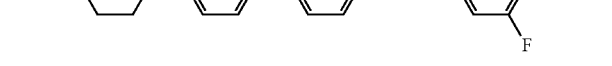
I-P-3
I-P-4
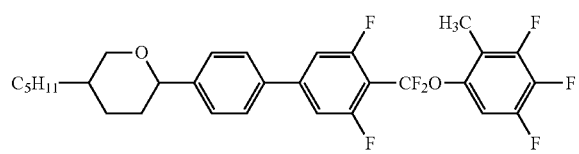
I-Q-1
I-Q-2
I-Q-3
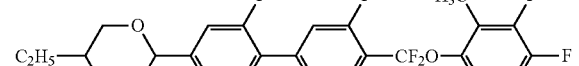
I-Q-4
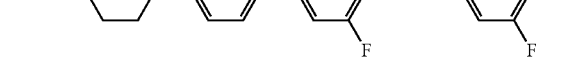
I-R-1
I-R-2
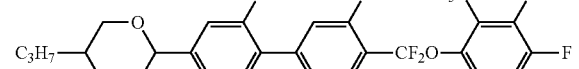
I-R-3
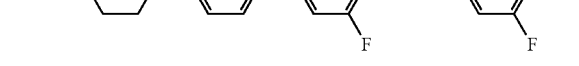
I-R-4

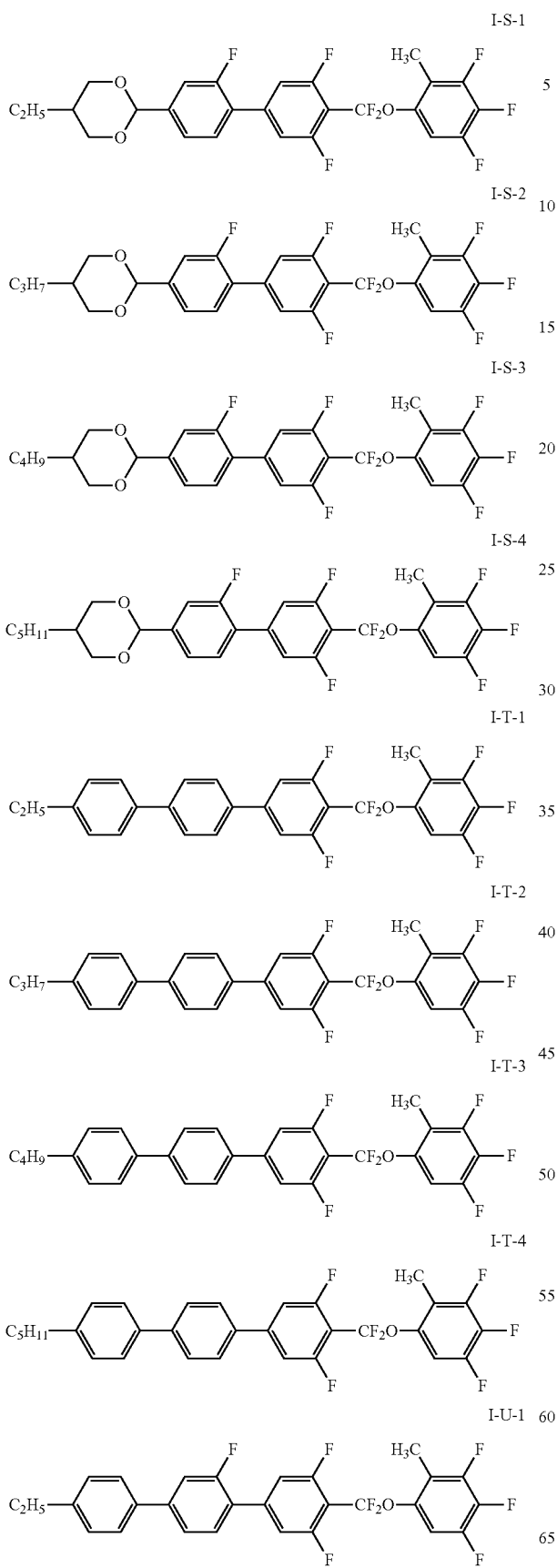
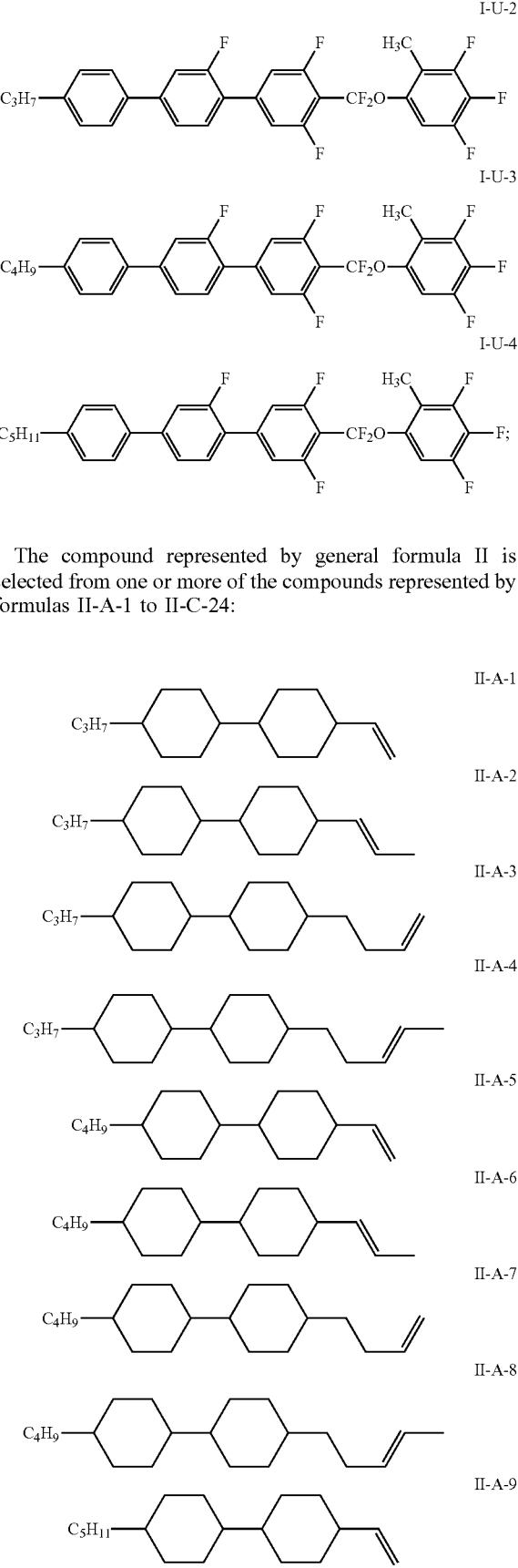
The compound represented by general formula II is selected from one or more of the compounds represented by formulas II-A-1 to II-C-24:

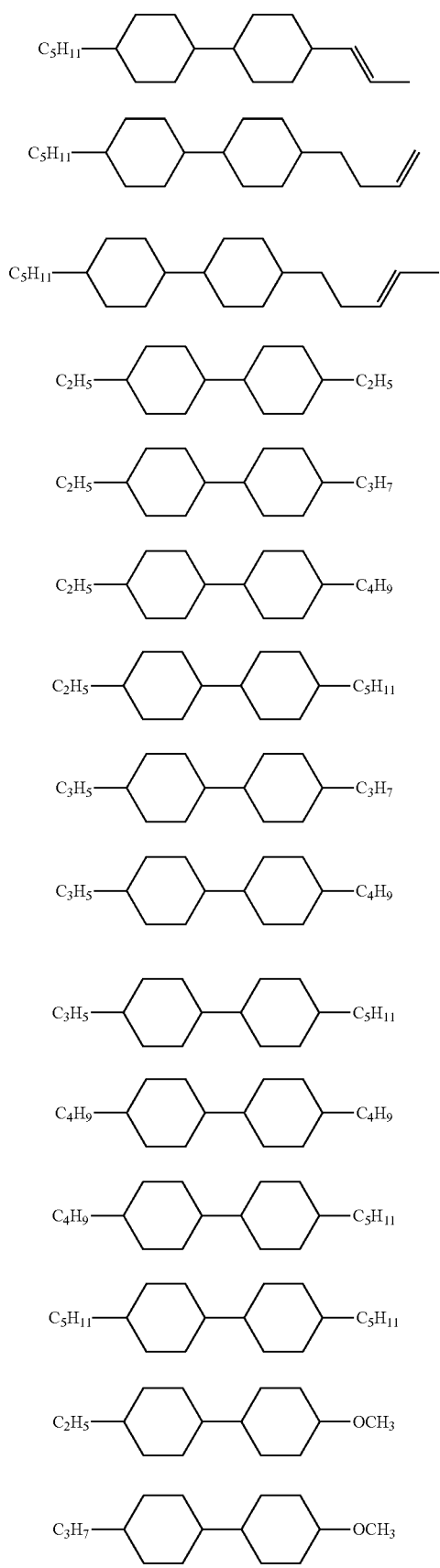
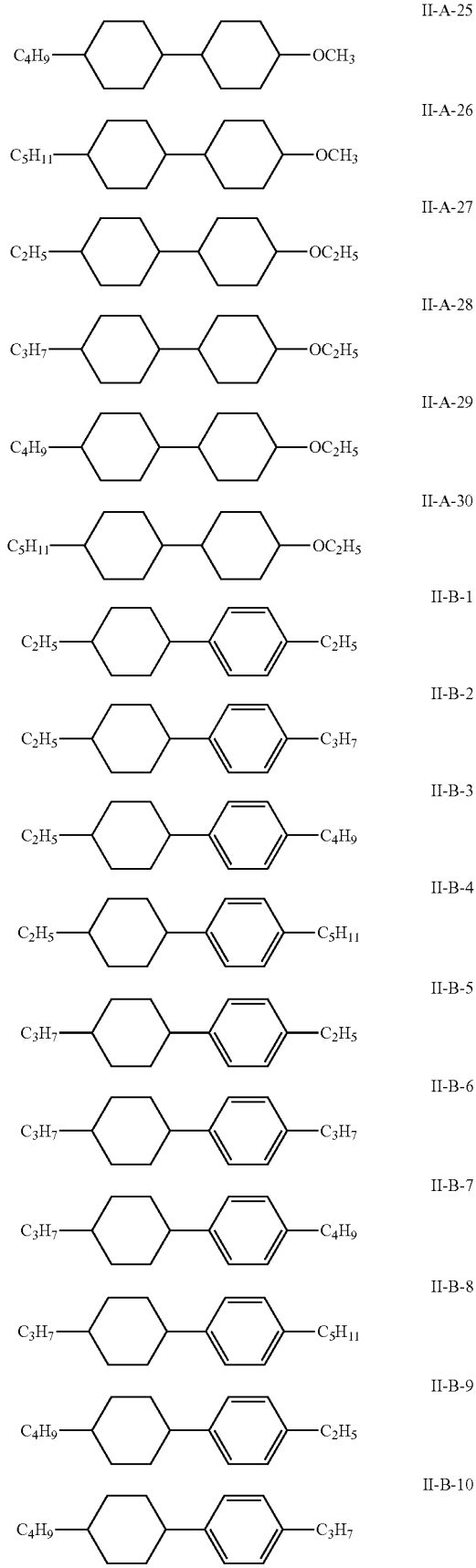

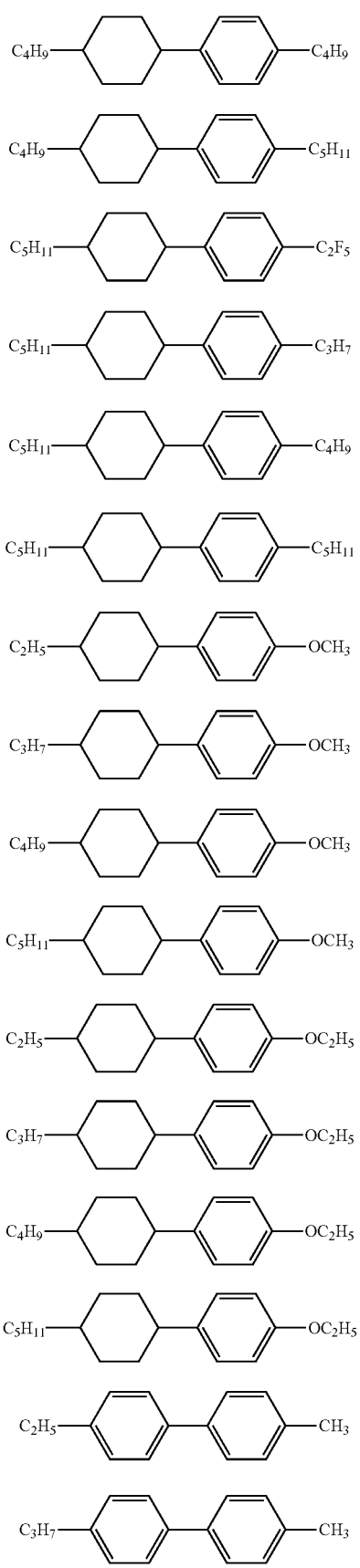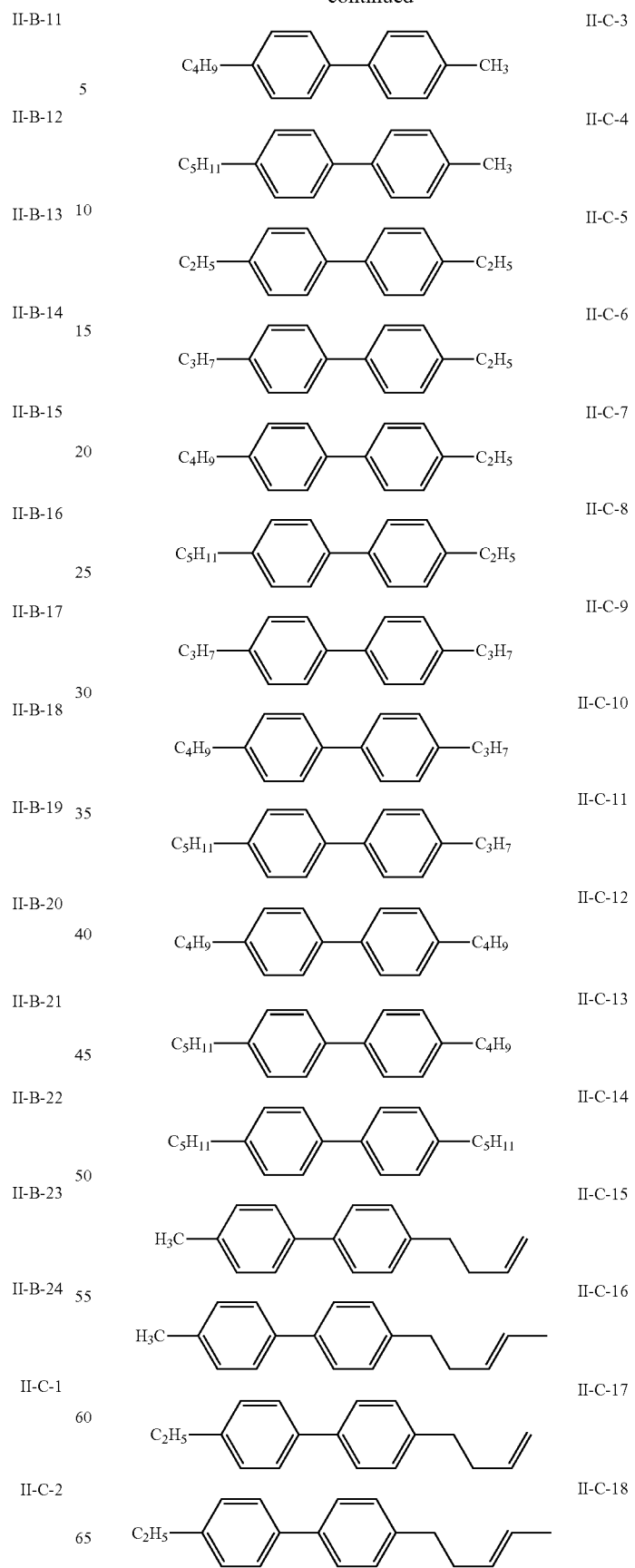

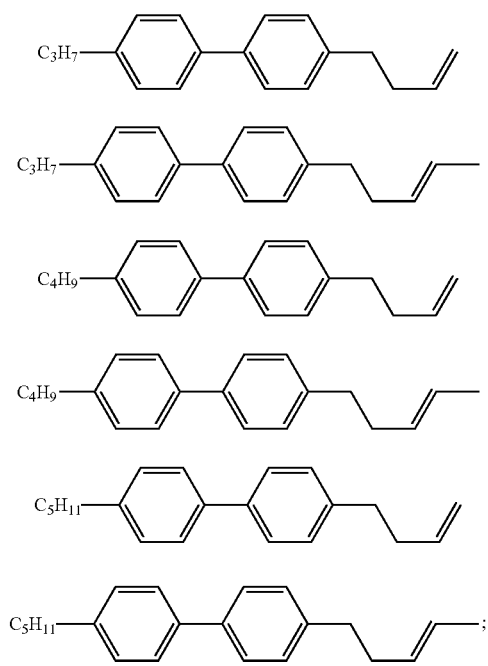

Particularly, the compound represented by general formula III is selected from one or more of the following compounds of formulas III-A to III-C:

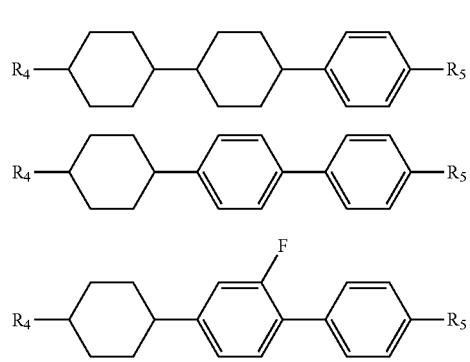

wherein $R_4$ each independently represents a $C_2$-$C_{10}$ linear alkyl group or linear alkenyl group; and $R_5$ each independently represents a $C_1$-$C_8$ linear alkyl group.

More preferably, the compound represented by general formula III is selected from one or more of the structures of formulas III-A-1 to III-C-30:

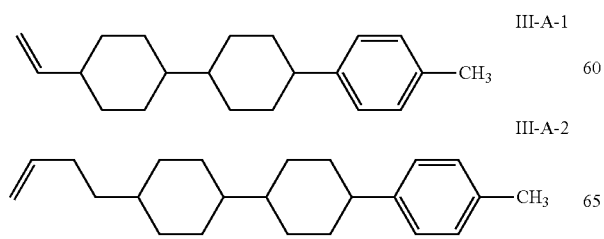

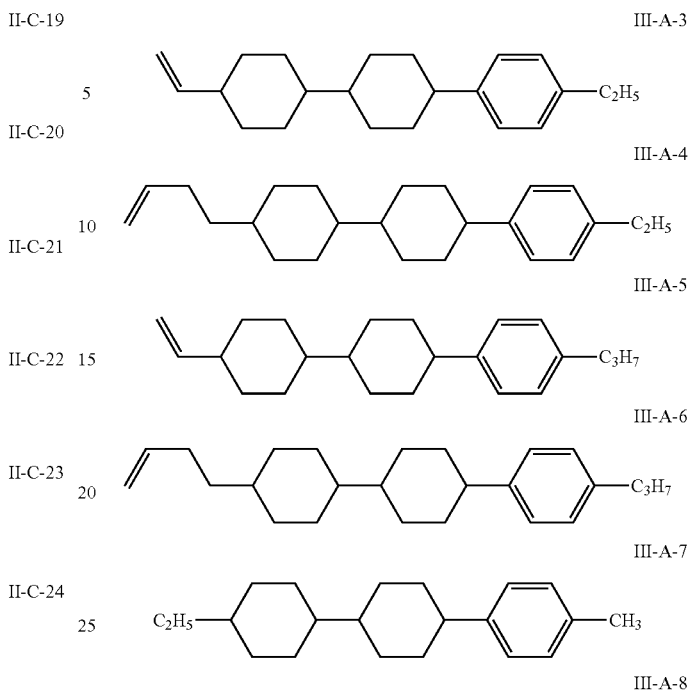

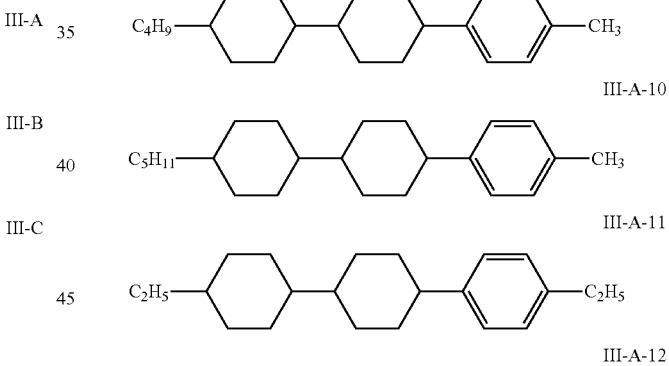

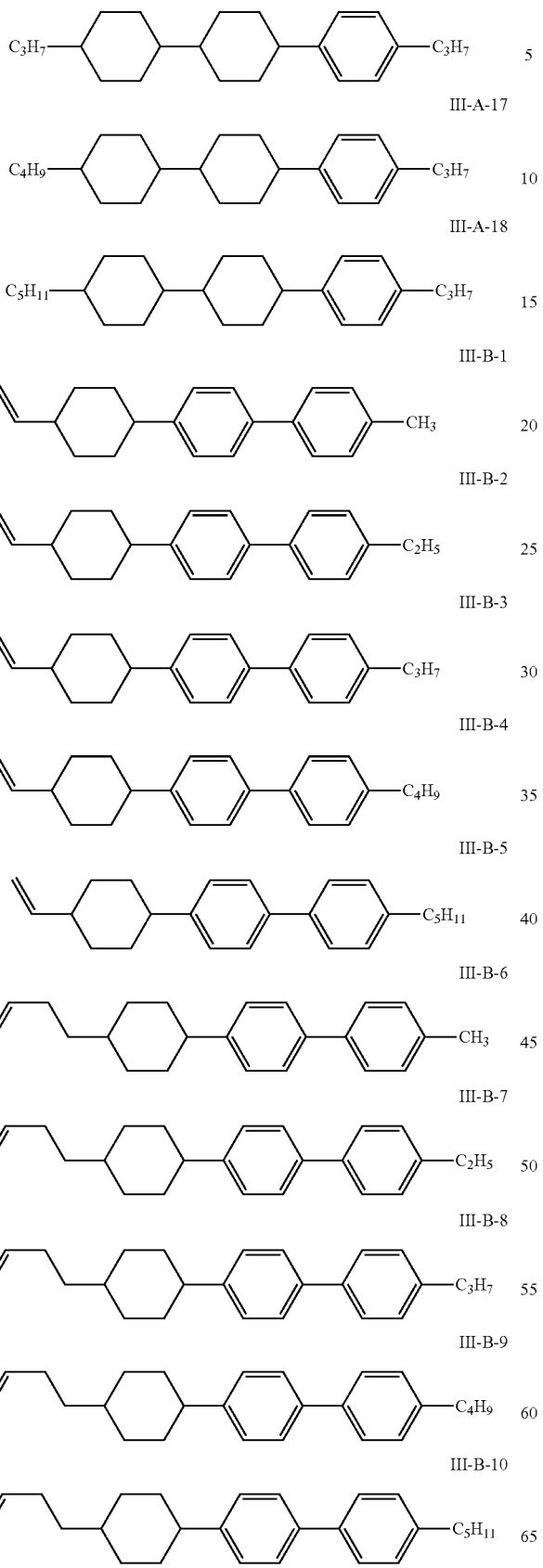
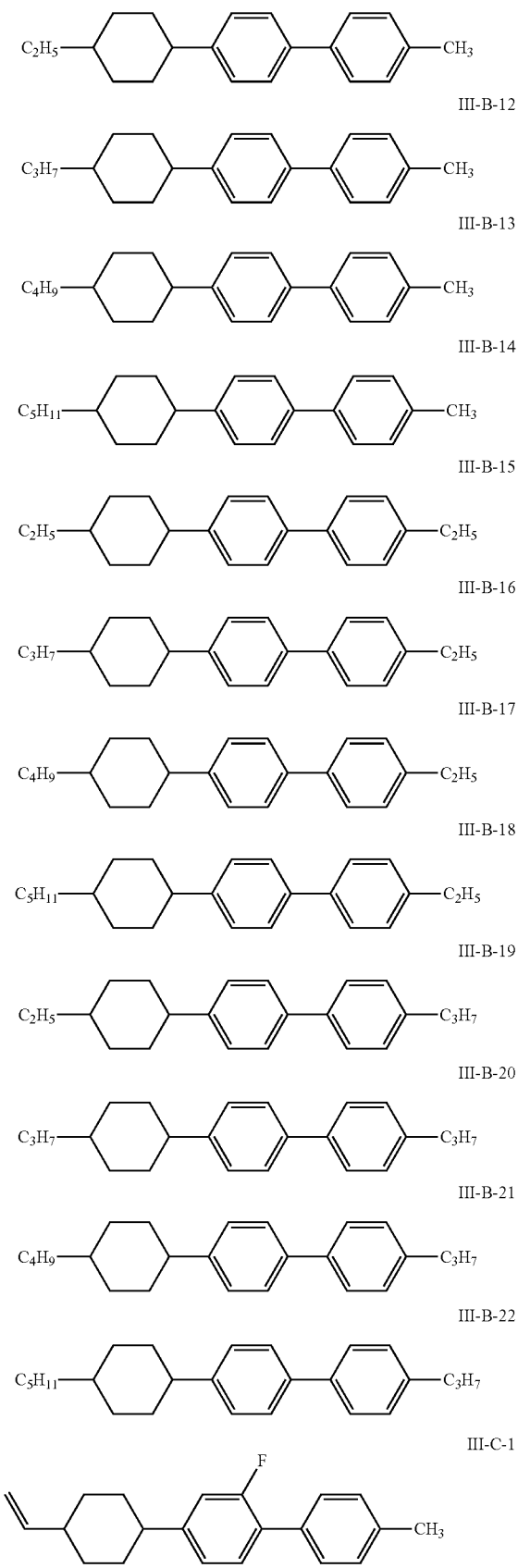

III-C-2
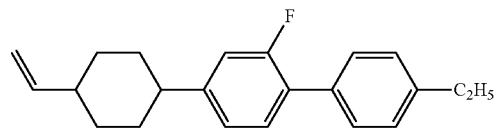
III-C-3
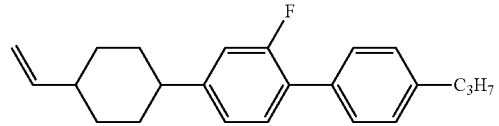
III-C-4
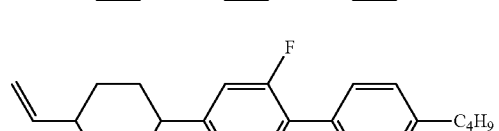
III-C-5
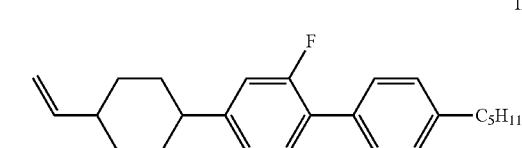
III-C-6
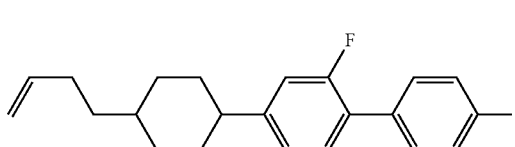
III-C-7
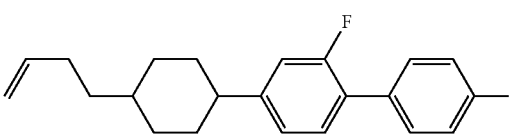
III-C-8
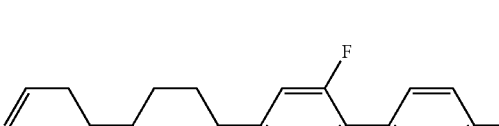
III-C-9
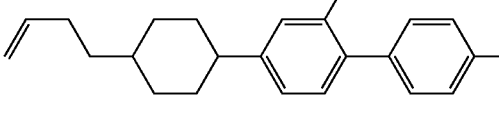
III-C-10
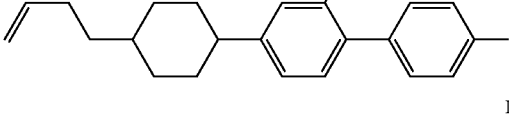
III-C-11
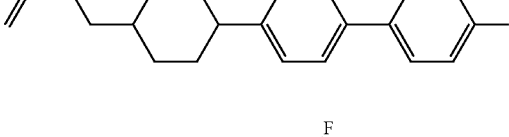
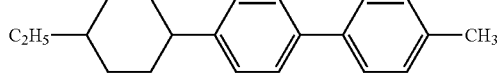
III-C-12
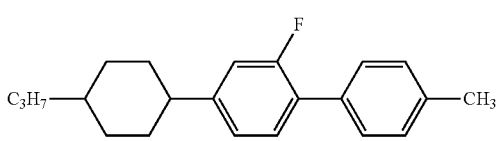
III-C-13
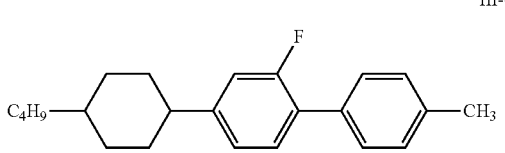
III-C-14
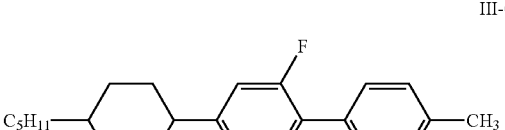
III-C-15
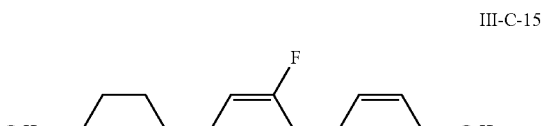
III-C-16
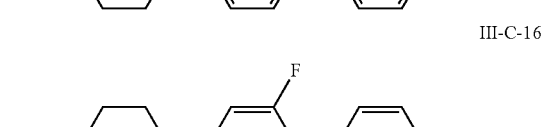
III-C-17
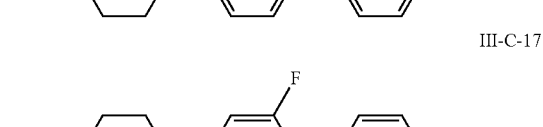
III-C-18
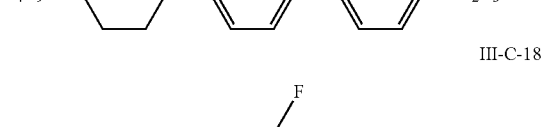
III-C-19
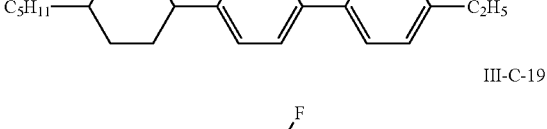
III-C-20
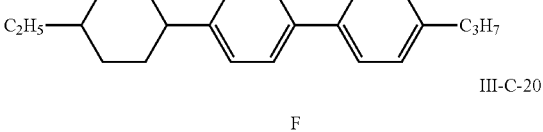
III-C-21
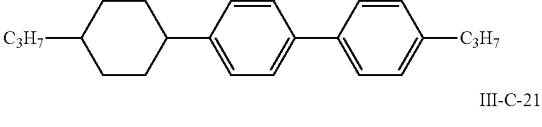

III-C-22
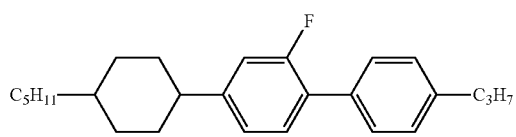
III-C-23
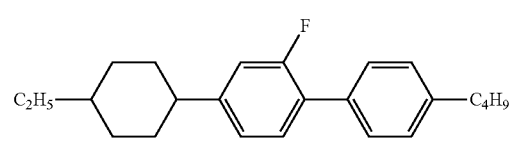
III-C-24
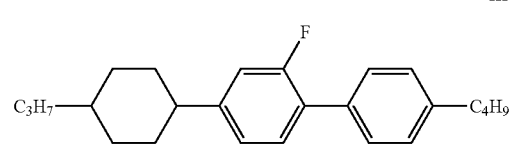
III-C-25
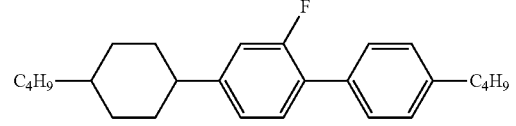
III-C-26
III-C-27
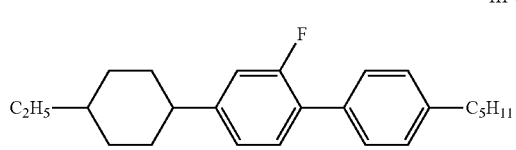
III-C-28
III-C-29
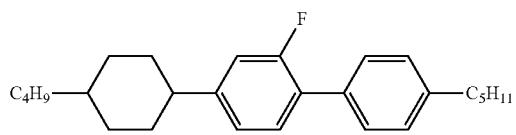
III-C-30
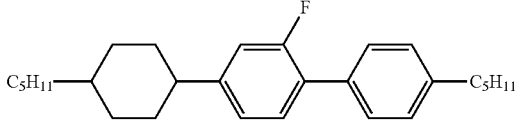
In particular, the compounds of general formulas IV to IX are selected from one or more of the following structures:
IV-A
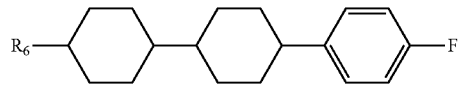
IV-B
IV-C
IV-D
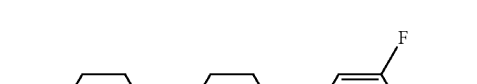
IV-E
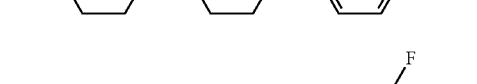
IV-F
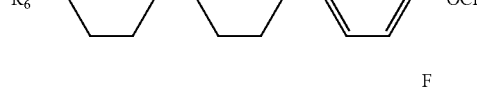
IV-G
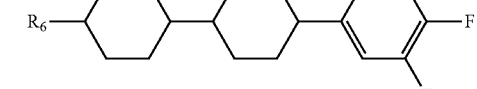
IV-H
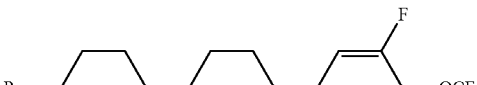
IV-I
V-A
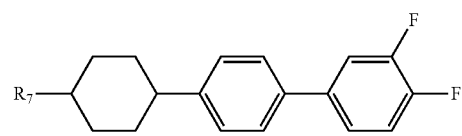

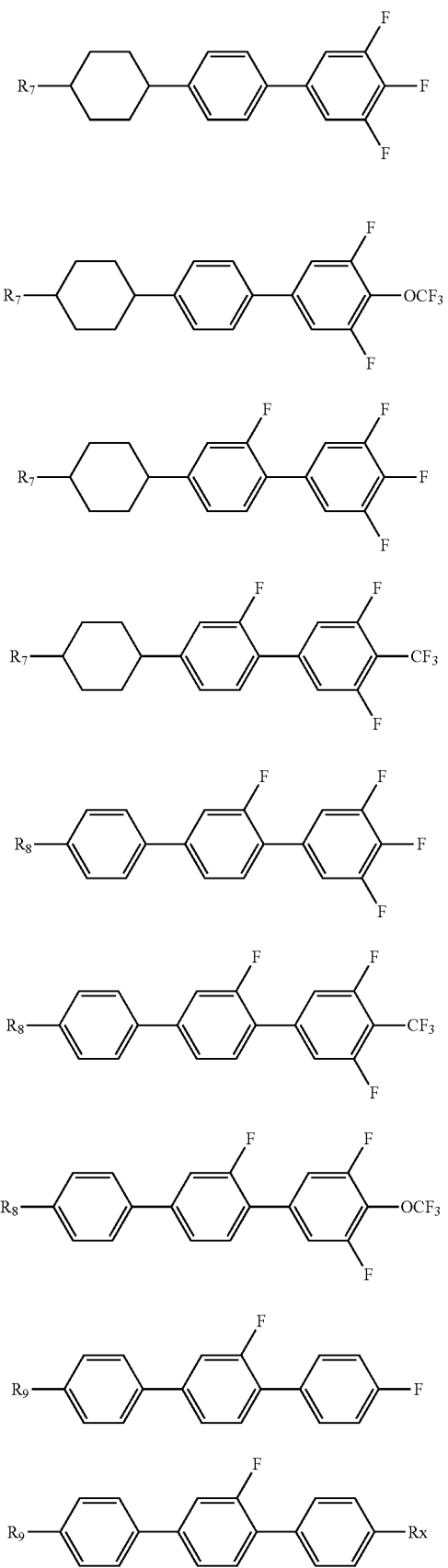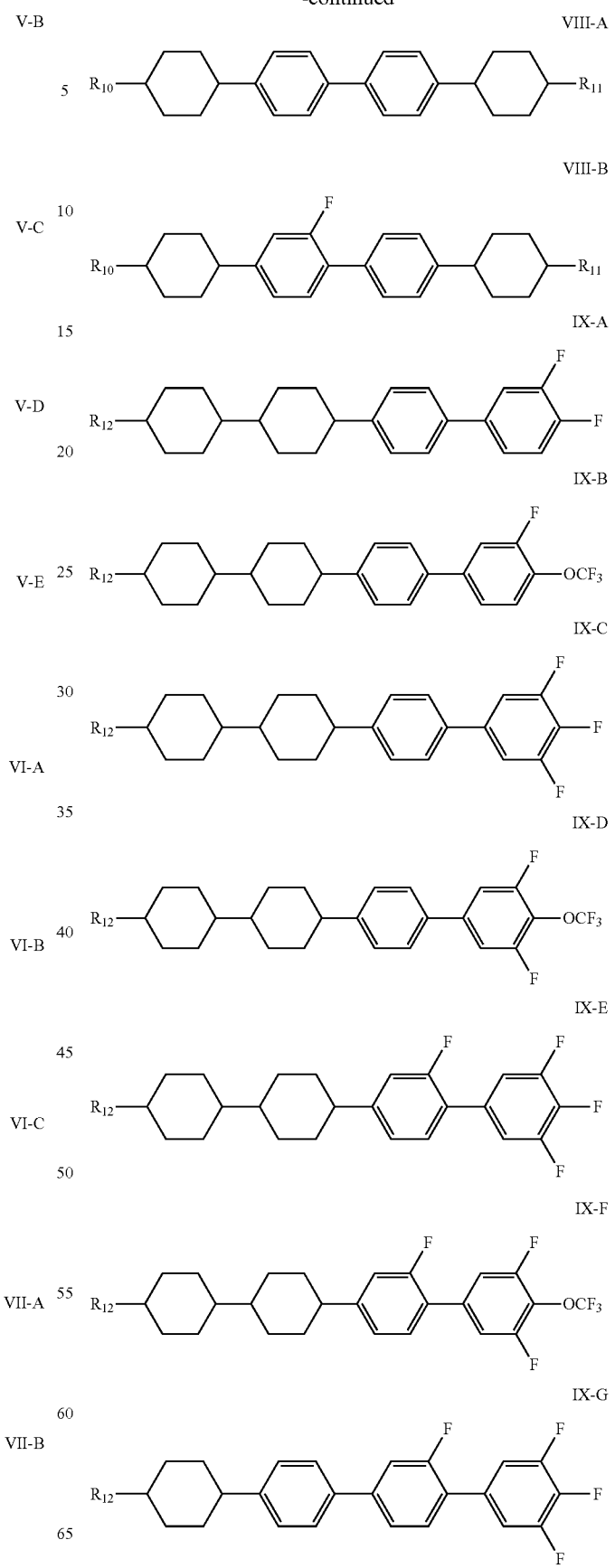

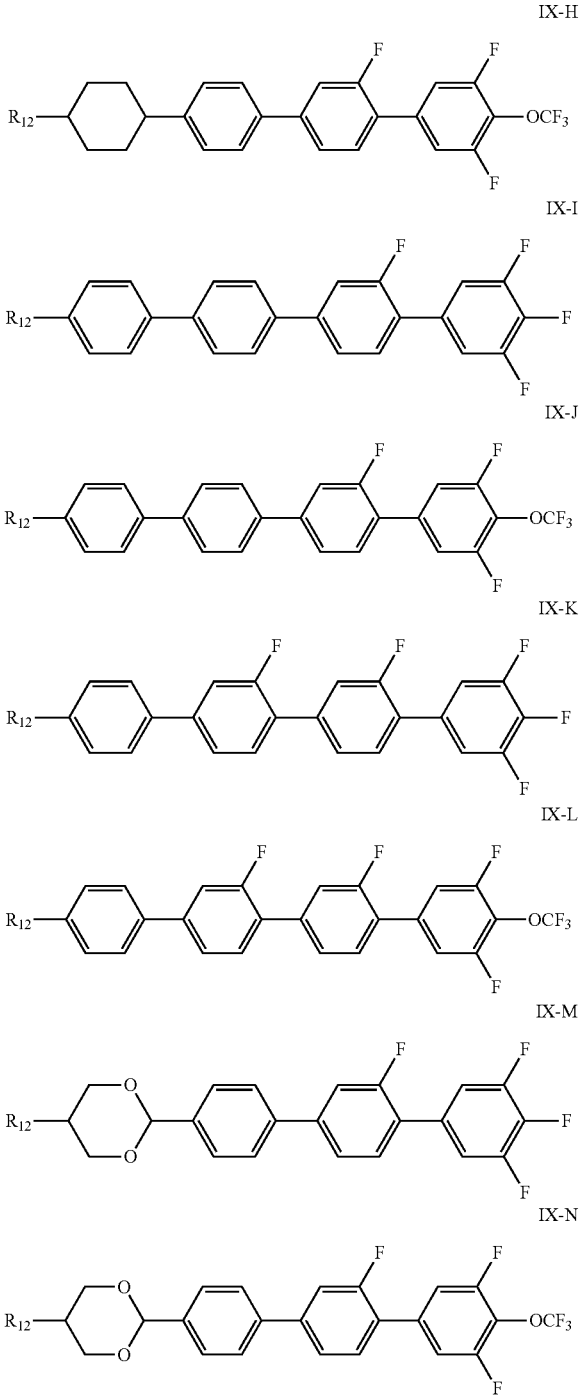

wherein $R_6$ each independently represents a $C_2$-$C_7$ linear alkyl group or linear alkenyl group; $R_7$, $R_8$ and $R_{10}$-$R_{12}$ each independently represent a $C_2$-$C_7$ linear alkyl group; $R_9$ and $R_x$ each independently represent a $C_1$-$C_7$ linear alkyl group or a $C_2$-$C_7$ linear alkenyl group.

More preferably, $R_6$ each independently represents a $C_2$-$C_5$ linear alkyl group or linear alkenyl group; $R_7$, $R_8$ and $R_{10}$-$R_{12}$ each independently represent a $C_2$-$C_5$ linear alkyl group; and $R_9$ and $R_x$ each independently represent a $C_1$-$C_5$ linear alkyl group or a $C_2$-$C_5$ linear alkenyl group.

The compound represented by general formula I in the liquid crystal composition provided by the present invention is a compound containing 2-methyl-3,4,5-trifluorobenzene linked to a difluoromethoxy bridge bond, wherein such compounds have a strong polarity and good mutual solubility characteristics, and the mutual solubility characteristics of such compounds can be effectively improved after the introduction of methyl in the second position, and surprisingly, as compared with methyl-free compounds, the compounds of type I provided by the present invention have a mutual solubility with an improvement of 30% or greater, and are more advantageous for improving the low temperature mutual solubility characteristics of the mixed liquid crystal; the compound represented by general formula II has a bicyclic structure and a low rotational viscosity and excellent mutual solubility characteristics, and is an essential component for a fast-response liquid crystal display; the compound represented by general formula III is a non-polar compound which has a high clearing point and a large elastic constant, and contributes to improving the elastic constant of the liquid crystal composition; and the compounds represented by general formulas IV to IX are mainly used for adjusting the clearing point and parameters, such as the optical anisotropy, of the liquid crystal composition.

The method for producing the liquid crystal composition of the present invention is not particularly limited, and the liquid crystal composition may be produced by mixing two or more compounds using a conventional method, e.g., being prepared by a method of mixing and dissolving various components at a high temperature, wherein the liquid crystal composition is dissolved in a solvent used for the compounds and mixed, and then the solvent is distilled off under a reduced pressure; or the liquid crystal composition of the present invention may be prepared according to a conventional method, e.g., being obtained by dissolving components with lower contents therein into main components with higher contents at a higher temperature, or dissolving the various components in an organic solvent, such as acetone, chloroform or methanol, and then mixing the solution, followed by the removal of the solvent.

The liquid crystal composition of the present invention has a low rotational viscosity, a large elastic constant, a good low temperature mutual solubility and a fast response speed, and can be used for fast-response liquid crystal display in a variety of display modes, and the use thereof in TN, IPS or FFS mode displays can significantly improve the display effect of liquid crystal displays.

SPECIFIC EMBODIMENTS

The following examples are intended to illustrate the invention, but not to limit the scope of the invention.

Unless otherwise indicated, the percentage in the present invention is weight percentage; the temperature unit is degrees Celsius; Δn represents optical anisotropy (at 25° C.); Δε represents dielectric anisotropy (at 25° C., 1000 Hz); $V_{10}$ represents voltage threshold, and is the characteristic voltage (V, at 25° C.) when the relative transmittance is changed by 10%; γ1 represents rotational viscosity (mPa·S, at 25° C.); Cp represents the clearing point (° C.) of the liquid crystal composition; and $K_{11}$, $K_{22}$ and $K_{33}$ represent splay, twist and bend elastic constants (pN, at 25° C.), respectively.

In each of the following examples, the group structures in the liquid crystal compound are represented by the codes shown in Table 1.

TABLE 1

Group structure codes of the liquid crystal compound

| Groups | Codes | Group names |
|---|---|---|
| (cyclohexane ring) | C | 1,4-cyclohexylene |
| (benzene ring) | P | 1,4-phenylene |
| (2-fluoro benzene) | G | 2-fluoro-1,4-phenylene |
| (2,6-difluoro benzene) | U | 2,6-difluoro-1,4-phenylene |
| (2-methyl-3,5-difluoro benzene) | K | 2-methyl-3,5-difluoro-1,4-phenylene |
| —O— | O | Oxygen substituent |
| —F | F | Fluorine substituent |
| —$CF_3$ | $CF_3$ | Trifluoromethyl |
| $C_nH_{2n+1}$ or $C_mH_{2m+1}$ | n or m | Alkyl group |
| —$CF_2O$— | Q | Difluoromethoxy bridge bond |
| —$OCF_2H$ | $OCF_2H$ | Difluoromethoxy |
| (tetrahydropyran) | A | 2,5-tetrahydropyran |
| (dioxane) | D | 2,6-dioxo-1,4-dioxane |
| —$(CH_2)_n$— | n | Alkylene |
| —C≡C— | T | Acetylenic bond |
| —HC═CH— | V | Alkenyl |

Taking the following compound structures as an example:

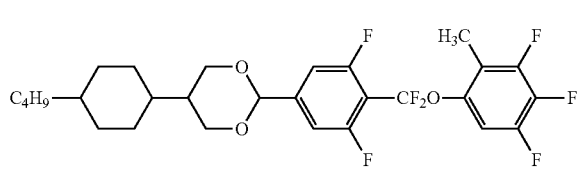

is represented as 4CDUQKF

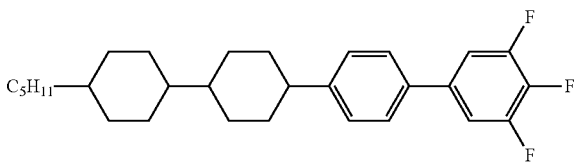

is represented as 5CCPUF

In each of the following examples, the liquid crystal compositions are all prepared by a thermal dissolution method, comprising the following steps of: weighing liquid crystal compounds in percentage by weight using a balance, wherein the order of weighing and addition is not particularly specified, and usually, the weighing and mixing are carried out successively in order of the melting points of the liquid crystal compounds from high to low; heating and stirring same at 60-100° C. so that each component is melted uniformly; then subjecting same to filtration and rotary evaporation; and finally performing encapsulation to obtain a target sample.

In each of the following examples, the weight percentage of each component in the liquid crystal composition and the performance parameters of the liquid crystal composition are shown in the following tables.

Example 1

TABLE 2

Percentages by weight of each component and performance parameters of the liquid crystal composition

| Types | Compound codes | Percentages by weight | Performance parameters | Parameter values |
|---|---|---|---|---|
| I | 2APUQKF | 5 | $\Delta n$ | 0.098 |
| I | 3PGUQKF | 6 | $\Delta \varepsilon$ | +2.6 |
| II | 3CCV1 | 12 | Cp | 81 |
| II | 1PP2V1 | 7 | $\gamma 1$ | 50 |
| II | 3CCV | 43 | $K_{11}$ | 13.9 |
| III | VCCP1 | 11 | $K_{22}$ | 7.0 |
| III | V2CCP1 | 9.5 | $K_{33}$ | 15.6 |
| VII | 2PGP3 | 6 | | |
| IX | 3PPGUF | 0.5 | | |

Example 2

TABLE 3

Percentages by weight of each component and performance parameters of the liquid crystal composition

| Types | Compound codes | Percentages by weight | Performance parameters | Parameter values |
|---|---|---|---|---|
| I | 3CPPQKF | 3 | $\Delta n$ | 0.122 |
| II | 3CCV | 51 | $\Delta \varepsilon$ | +2.3 |
| II | 3CCV1 | 7 | Cp | 75 |
| VI | 3PGUF | 11 | $\gamma 1$ | 46 |
| VII | 1PGP2V | 7 | $K_{11}$ | 12.2 |
| VII | 2PGP2V | 8 | $K_{22}$ | 6.1 |
| VII | V2PGP1 | 13 | $K_{33}$ | 14.0 |

Example 3

TABLE 4

Percentages by weight of each component and performance parameters of the liquid crystal composition

| Types | Compound codes | Percentages by weight | Performance parameters | Parameter values |
|---|---|---|---|---|
| I | 2APUQKF | 5 | $\Delta n$ | 0.098 |
| I | 3PGUQKF | 5 | $\Delta \varepsilon$ | +2.6 |
| II | 3CCV | 43 | Cp | 81 |
| II | 3CCV1 | 12 | $\gamma 1$ | 49 |
| II | 1PP2V1 | 7 | $K_{11}$ | 13.8 |
| III | VCCP1 | 11 | $K_{22}$ | 6.9 |
| III | V2CCP1 | 9 | $K_{33}$ | 16.2 |
| VII | 2PGPF | 6 | | |
| IX | 3PPGUF | 2 | | |

Example 4

TABLE 5

Percentages by weight of each component and performance parameters of the liquid crystal composition

| Types | Compound codes | Percentages by weight | Performance parameters | Parameter values |
|---|---|---|---|---|
| I | 3CPPQKF | 6 | $\Delta n$ | 0.117 |
| II | 3CCV | 40 | $\Delta \varepsilon$ | +5.2 |
| II | 5PP1 | 7 | Cp | 81 |
| III | VCCP1 | 6 | $\gamma 1$ | 48 |
| III | 3CCP1 | 5 | $K_{11}$ | 12.8 |
| IV | 3CCPOCF$_3$ | 5 | $K_{22}$ | 6.3 |
| V | 2CGUF | 4 | $K_{33}$ | 13.6 |
| V | 3CPGF | 6 | | |
| VI | 2PGUF | 10 | | |
| VII | 2PGPF | 7 | | |
| IX | 3CCPUF | 4 | | |

Example 5

TABLE 6

Percentages by weight of each component and performance parameters of the liquid crystal composition

| Types | Compound codes | Percentages by weight | Performance parameters | Parameter values |
|---|---|---|---|---|
| I | 4DGUQKF | 2 | $\Delta n$ | 0.101 |
| I | 3CPPQKF | 9 | $\Delta \varepsilon$ | +5.8 |
| I | 3CPUQKF | 5 | Cp | 91 |
| I | 3PUQKF | 11 | $\gamma 1$ | 62 |
| II | 3CC2V1 | 4 | $K_{11}$ | 13.8 |
| II | 3CCV1 | 5 | $K_{22}$ | 6.9 |
| II | 3CCV | 35 | $K_{33}$ | 17.1 |
| III | VCPP3 | 8 | | |
| III | V2CCP1 | 10 | | |
| III | VCCP1 | 11 | | |

Example 6

TABLE 7

Percentages by weight of each component and performance parameters of the liquid crystal composition

| Types | Compound codes | Percentages by weight | Performance parameters | Parameter values |
|---|---|---|---|---|
| I | 3CCQKF | 19 | $\Delta n$ | 0.098 |
| II | 5CCV | 13 | $\Delta \varepsilon$ | +9.4 |
| II | 3CCV1 | 4 | Cp | 101 |
| IV | 2CCUF | 8 | $\gamma 1$ | 111 |
| IV | 3CCUF | 8 | $K_{11}$ | 11.0 |
| IV | 2CCGF | 3 | $K_{22}$ | 5.5 |
| IV | 3CCGF | 3 | $K_{33}$ | 15.7 |
| IV | 5CCGF | 3 | | |
| V | 3CPUF | 23 | | |
| IX | 2CCPUF | 4 | | |
| IX | 3CCPUF | 4 | | |
| IX | 4CCPUF | 4 | | |
| IX | 5CCPUF | 4 | | |

Example 7

TABLE 8

Percentages by weight of each component and performance parameters of the liquid crystal composition

| Types | Compound codes | Percentages by weight | Performance parameters | Parameter values |
|---|---|---|---|---|
| I | 3CUQKF | 7 | $\Delta n$ | 0.116 |
| I | 3PUQKF | 17 | $\Delta \varepsilon$ | +9.0 |
| II | 3CCV | 22 | Cp | 90 |
| III | VCCP1 | 10 | $\gamma 1$ | 95 |
| III | V2CCP1 | 7 | $K_{11}$ | 12.8 |
| IV | 3CCPOCF$_3$ | 5 | $K_{22}$ | 6.4 |
| V | 3CPUF | 10 | $K_{33}$ | 16.5 |
| VII | 2PGP3 | 6 | | |
| IX | 2CCPUF | 4 | | |
| IX | 3CCPUF | 5 | | |
| IX | 4CCPUF | 4 | | |
| IX | 3CCGUF | 3 | | |

Example 8

TABLE 9

Percentages by weight of each component and performance parameters of the liquid crystal composition

| Types | Compound codes | Percentages by weight | Performance parameters | Parameter values |
|---|---|---|---|---|
| I | 3PUQKF | 16 | $\Delta n$ | 0.116 |
| II | 3CCV1 | 8 | $\Delta \varepsilon$ | +9.0 |
| II | 5CCV | 14 | Cp | 94 |
| IV | VCCGF | 5 | $\gamma 1$ | 105 |
| IV | 3CCUOCF$_2$H | 10 | $K_{11}$ | 13.0 |
| IV | 3CCPOCF$_3$ | 5 | $K_{22}$ | 6.5 |
| IV | 5CCPOCF$_3$ | 5 | $K_{33}$ | 16.6 |
| V | 3CPUF | 15 | | |
| VII | 2PGPF | 5 | | |
| VII | 2PGP3 | 3 | | |
| VIII | 3CPPC3 | 4 | | |
| IX | 3CCGUF | 5 | | |
| IX | 3CCPUF | 5 | | |

Example 9

TABLE 10

Percentages by weight of each component and performance parameters of the liquid crystal composition

| Types | Compound codes | Percentages by weight | Performance parameters | Parameter values |
|---|---|---|---|---|
| I | 3PGUQKF | 2 | $\Delta n$ | 0.111 |
| I | 4PGUQKF | 8 | $\Delta\varepsilon$ | +7.5 |
| I | 3PUQKF | 12 | Cp | 75 |
| II | 3CCV | 45 | $\gamma 1$ | 45 |
| IV | 3CCUF | 10 | $K_{11}$ | 10.5 |
| VII | 2PGP3 | 10 | $K_{22}$ | 5.3 |
| VII | 2PGP4 | 4 | $K_{33}$ | 13.0 |
| IX | 2CCPUF | 3 | | |
| IX | 3CCPUF | 3 | | |
| IX | 4CCPUF | 3 | | |

Example 10

TABLE 11

Percentages by weight of each component and performance parameters of the liquid crystal composition

| Types | Compound codes | Percentages by weight | Performance parameters | Parameter values |
|---|---|---|---|---|
| I | 3APUQKF | 14 | $\Delta n$ | 0.096 |
| I | 3CCQKF | 13 | $\Delta\varepsilon$ | +12.5 |
| I | 3PUQKF | 12 | Cp | 90 |
| II | 3CCV | 24 | $\gamma 1$ | 76 |
| III | VCCP1 | 9 | $K_{11}$ | 11.0 |
| IV | 2CCUF | 5 | $K_{22}$ | 5.5 |
| IV | 3CCUF | 10 | $K_{33}$ | 13.6 |
| IV | 3CCPOCF$_3$ | 5 | | |
| IX | 3CCGUF | 4 | | |
| IX | 2CCPUF | 4 | | |

Example 11

TABLE 12

Percentages by weight of each component and performance parameters of the liquid crystal composition

| Types | Compound codes | Percentages by weight | Performance parameters | Parameter values |
|---|---|---|---|---|
| I | 3CDUQKF | 13 | $\Delta n$ | 0.097 |
| I | 2APUQKF | 10 | $\Delta\varepsilon$ | 12.8 |
| I | 3APUQKF | 5 | Cp | 89 |
| I | 3PUQKF | 10 | $\gamma 1$ | 67 |
| II | 3CCV | 42 | $K_{11}$ | 12.9 |
| III | VCCP1 | 6 | $K_{22}$ | 6.5 |
| IX | 3CCGUF | 5 | $K_{33}$ | 15.0 |
| IX | 2CCPUF | 5 | | |
| IX | 3CCPUF | 4 | | |

Example 12

TABLE 13

Percentages by weight of each component and performance parameters of the liquid crystal composition

| Types | Compound codes | Percentages by weight | Performance parameters | Parameter values |
|---|---|---|---|---|
| I | 3CCQKF | 15 | $\Delta n$ | 0.100 |
| I | 3GUQKF | 5 | $\Delta\varepsilon$ | +8.7 |
| I | 3APUQKF | 9 | Cp | 100 |
| I | 3PGUQKF | 5 | $\gamma 1$ | 80 |
| II | 3CCV | 34 | $K_{11}$ | 13.6 |
| II | 3CCV1 | 2 | $K_{22}$ | 6.9 |
| III | VCCP1 | 2 | $K_{33}$ | 17.0 |
| IV | 3CCUF | 9 | | |
| IV | 3CCPOCF$_3$ | 5 | | |
| VIII | 3CPPC3 | 3 | | |
| IX | 3CCGUF | 5 | | |
| IX | 3CPGUOCF$_3$ | 6 | | |

Example 13

TABLE 14

Percentages by weight of each component and performance parameters of the liquid crystal composition

| Types | Compound codes | Percentages by weight | Performance parameters | Parameter values |
|---|---|---|---|---|
| I | 3CPPQKF | 3 | $\Delta n$ | 0.122 |
| II | 3CCV | 50 | $\Delta\varepsilon$ | +2.4 |
| II | 3CCV1 | 9 | Cp | 75 |
| VI | 2PGUF | 11 | $\gamma 1$ | 46 |
| VII | 1PGP2V | 6 | $K_{11}$ | 12.2 |
| VII | 2PGP2V | 8 | $K_{22}$ | 6.1 |
| VII | V2PGP1 | 13 | $K_{33}$ | 12.8 |

Example 14

TABLE 15

Percentages by weight of each component and performance parameters of the liquid crystal composition

| Types | Compound codes | Percentages by weight | Performance parameters | Parameter values |
|---|---|---|---|---|
| I | 3PUQKF | 9 | $\Delta n$ | 0.116 |
| II | 3CCV | 38 | $\Delta\varepsilon$ | +5.2 |
| II | 3CCV1 | 10 | Cp | 75 |
| III | VCCP1 | 3 | $\gamma 1$ | 46 |
| III | V2CCP1 | 9 | $K_{11}$ | 12.5 |
| VI | 2PGUF | 8 | $K_{22}$ | 6.3 |
| VI | 3PGUF | 9 | $K_{33}$ | 12.8 |
| VII | 2PGP3 | 5 | | |
| VII | 2PGP4 | 5 | | |
| VIII | 3CPPC3 | 4 | | |

Example 15

TABLE 16

Percentages by weight of each component and performance parameters of the liquid crystal composition

| Types | Compound codes | Percentages by weight | Performance parameters | Parameter values |
|---|---|---|---|---|
| I | 2APUQKF | 10 | $\Delta n$ | 0.101 |
| I | 3PUQKF | 15 | $\Delta \varepsilon$ | +9.3 |
| I | 3APUQKF | 2 | Cp | 80 |
| II | 3CCV | 42 | $\gamma 1$ | 54 |
| III | VCCP1 | 9 | $K_{11}$ | 10.9 |
| IV | 3CCPOCF$_3$ | 10 | $K_{22}$ | 5.5 |
| IX | 3PPGUF | 2 | $K_{33}$ | 15.0 |
| IX | 3CPGUOCF$_3$ | 10 | | |

Example 16

TABLE 17

Percentages by weight of each component and performance parameters of the liquid crystal composition

| Types | Compound codes | Percentages by weight | Performance parameters | Parameter values |
|---|---|---|---|---|
| I | 3PUQKF | 8 | $\Delta n$ | 0.100 |
| II | 3CCV | 27 | $\Delta \varepsilon$ | +6.3 |
| II | 3CCV1 | 5 | Cp | 90 |
| III | VCCP1 | 13 | $\gamma 1$ | 68 |
| III | V2CCP1 | 11 | $K_{11}$ | 12.2 |
| IV | VCCGF | 6 | $K_{22}$ | 6.1 |
| IV | 3CCUF | 4 | $K_{33}$ | 16.0 |
| V | 3CPUF | 9 | | |
| V | 3CGUF | 7 | | |
| VI | 2PGUF | 3 | | |
| IX | 3CCGUF | 7 | | |

Example 17

TABLE 18

Percentages by weight of each component and performance parameters of the liquid crystal composition

| Types | Compound codes | Percentages by weight | Performance parameters | Parameter values |
|---|---|---|---|---|
| I | 3PUQKF | 15 | $\Delta n$ | 0.100 |
| II | 3CCV | 32 | $\Delta \varepsilon$ | +6.3 |
| III | 3CCP1 | 7 | Cp | 90 |
| III | 3CCP2 | 6 | $\gamma 1$ | 71 |
| III | 3CCP3 | 3 | $K_{11}$ | 13.5 |
| III | 3CPP2 | 3 | $K_{22}$ | 6.8 |
| IV | 2CCGF | 6 | $K_{33}$ | 16.0 |
| IV | 3CCGF | 10 | | |
| V | 3CPGF | 6 | | |
| IX | 2CCPUF | 4 | | |
| IX | 3CCPUF | 4 | | |
| IX | 4CCPUF | 4 | | |

Example 18

TABLE 19

Percentages by weight of each component and performance parameters of the liquid crystal composition

| Types | Compound codes | Percentages by weight | Performance parameters | Parameter values |
|---|---|---|---|---|
| I | 3PUQKF | 15 | $\Delta n$ | 0.100 |
| II | 3CCV | 32 | $\Delta \varepsilon$ | +6.2 |
| III | VCCP1 | 10 | Cp | 90 |
| III | V2CCP1 | 6 | $\gamma 1$ | 68 |
| III | VCPP3 | 3 | $K_{11}$ | 13.2 |
| IV | VCCGF | 6 | $K_{22}$ | 6.6 |
| IV | 3CCPOCF$_3$ | 10 | $K_{33}$ | 15.8 |
| V | 3CPGF | 6 | | |
| IX | 2CCPUF | 4 | | |
| IX | 3CCPUF | 4 | | |
| IX | 4CCPUF | 4 | | |

Example 19

TABLE 20

Percentages by weight of each component and performance parameters of the liquid crystal composition

| Types | Compound codes | Percentages by weight | Performance parameters | Parameter values |
|---|---|---|---|---|
| I | 2APUQKF | 5.5 | $\Delta n$ | 0.098 |
| I | 3PGUQKF | 6 | $\Delta \varepsilon$ | +2.6 |
| II | 3CCV1 | 12 | Cp | 81 |
| II | 5PP1 | 6 | $\gamma 1$ | 51 |
| II | 3CCV | 43 | $K_{11}$ | 13.8 |
| III | VCCP1 | 11 | $K_{22}$ | 6.9 |
| III | V2CCP1 | 7 | $K_{33}$ | 15.4 |
| III | VCPP3 | 3.5 | | |
| VII | 2PGPF | 6 | | |

Example 20

TABLE 21

Percentages by weight of each component and performance parameters of the liquid crystal composition

| Types | Compound codes | Percentages by weight | Performance parameters | Parameter values |
|---|---|---|---|---|
| I | 3PGUQKF | 4 | $\Delta n$ | 0.099 |
| I | 3PUQKF | 16 | $\Delta \varepsilon$ | +7.8 |
| II | 3CCV | 33 | Cp | 91 |
| II | 3CCV1 | 3 | $\gamma 1$ | 70 |
| II | 5PP1 | 5 | $K_{11}$ | 12.5 |
| III | 3CCP1 | 6 | $K_{22}$ | 6.3 |
| IV | 2CCGF | 6 | $K_{33}$ | 17.5 |
| IV | 3CCGF | 9 | | |
| IV | 3CCPOCF$_3$ | 6 | | |
| IX | 2CCPUF | 4 | | |
| IX | 3CCPUF | 4 | | |
| IX | 4CCPUF | 4 | | |

Example 21

TABLE 22

Percentages by weight of each component and performance parameters of the liquid crystal composition

| Types | Compound codes | Percentages by weight | Performance parameters | Parameter values |
|---|---|---|---|---|
| I | 3PGUQKF | 12 | $\Delta n$ | 0.101 |
| I | 3PGUQKF | 4 | $\Delta \varepsilon$ | +5.8 |
| II | 3CCV | 34 | Cp | 91 |
| II | 3CCV1 | 5 | $\gamma 1$ | 62 |
| II | 5PP1 | 7 | $K_{11}$ | 13.7 |
| III | 3CPP2 | 6 | $K_{22}$ | 6.9 |
| III | VCCP1 | 3 | $K_{33}$ | 16.8 |
| III | 3CCP1 | 6 | | |
| IV | 3CCPOCF$_3$ | 7 | | |
| IV | 3CCGF | 8 | | |
| IX | 3CCPGF | 4 | | |
| IX | 3CCPGOCF$_3$ | 4 | | |

Example 22

TABLE 23

Percentages by weight of each component and performance parameters of the liquid crystal composition

| Types | Compound codes | Percentages by weight | Performance parameters | Parameter values |
|---|---|---|---|---|
| I | 2APUQKF | 6 | $\Delta n$ | 0.098 |
| I | 3PGUQKF | 6 | $\Delta \varepsilon$ | +2.6 |
| II | 3CCV1 | 12 | Cp | 80 |
| II | 5PP1 | 8 | $\gamma 1$ | 51 |
| II | 3CCV | 43 | $K_{11}$ | 13.8 |
| III | VCCP1 | 9 | $K_{22}$ | 6.9 |
| III | V2CCP1 | 7 | $K_{33}$ | 15.4 |
| III | VCPP3 | 3 | | |
| III | 3CPP2 | 6 | | |

Example 23

TABLE 24

Percentages by weight of each component and performance parameters of the liquid crystal composition

| Types | Compound codes | Percentages by weight | Performance parameters | Parameter values |
|---|---|---|---|---|
| I | 3PGUQKF | 7.5 | $\Delta n$ | 0.098 |
| II | 3CCV | 42 | $\Delta \varepsilon$ | +2.6 |
| II | 3CCV1 | 10 | Cp | 80 |
| II | 5PP1 | 7 | $\gamma 1$ | 51 |
| III | VCCP1 | 13 | $K_{11}$ | 13.6 |
| III | V2CCP1 | 12 | $K_{22}$ | 6.8 |
| VII | 2PGPF | 7 | $K_{33}$ | 16.0 |
| VII | 3PGPF | 1.5 | | |

Example 24

TABLE 25

Percentages by weight of each component and performance parameters of the liquid crystal composition

| Types | Compound codes | Percentages by weight | Performance parameters | Parameter values |
|---|---|---|---|---|
| I | 3PGUQKF | 7.5 | $\Delta n$ | 0.098 |
| II | 3CCV | 40 | $\Delta \varepsilon$ | +2.6 |
| II | 3CCV1 | 11 | Cp | 81 |
| II | 5PP1 | 8 | $\gamma 1$ | 50 |
| III | VCCP1 | 14 | $K_{11}$ | 14.2 |
| III | V2CCP1 | 7 | $K_{22}$ | 7.1 |
| III | 3CCP1 | 5 | $K_{33}$ | 15.7 |
| VII | 2PGPF | 7.5 | | |

Example 25

TABLE 26

Percentages by weight of each component and performance parameters of the liquid crystal composition

| Types | Compound codes | Percentages by weight | Performance parameters | Parameter values |
|---|---|---|---|---|
| I | 3PGUQKF | 4 | $\Delta n$ | 0.102 |
| I | 3PUQKF | 10 | $\Delta \varepsilon$ | +5.8 |
| I | 2APUQKF | 5 | Cp | 90 |
| II | 3CCV | 40 | $\gamma 1$ | 64 |
| II | 3CCV1 | 5 | $K_{11}$ | 13.5 |
| III | VCCP1 | 12 | $K_{22}$ | 6.8 |
| III | 3CPP2 | 5 | $K_{33}$ | 16.7 |
| III | 3CCP1 | 4 | | |
| IV | 3CCPOCF$_3$ | 4 | | |
| VII | 2PGPF | 5 | | |
| IX | 3CCPGF | 3 | | |
| IX | 5CCPGF | 3 | | |

Comparative Example 1

As compared with methyl-free compounds, the compounds of type I provided by the present invention have a mutual solubility with an improvement of 30% or greater. The experimental method is a conventional method for low temperature observation and implementation: adding same in percentage by mass into a host LC, and pouring into a liquid crystal cell at −40° C., and the specific results thereof can be found in the following table:

TABLE 27

Low temperature mutual solubility comparison

| Addition proportions | Host LC | 3APUQUF | 3APUQKF | 3PGUQUF | 3PGUQKF |
|---|---|---|---|---|---|
| | OK | | | | |
| 10 | | OK | OK | NG | OK |
| 15 | | NG | OK | OK | OK |
| 20 | | | OK | OK | NG |

As compared with methyl-free single crystals, the single crystal provided by the invention still maintains a good low temperature mutual solubility when the added mass is 5% more, and it can be seen therefrom that the single crystal of type I provided by the present invention has an excellent low temperature mutual solubility and can effectively improve the low temperature stability of the liquid crystal composition.

Comparative Example 2

TABLE 28

Percentages by weight of each component and performance parameters of the liquid crystal composition

| Compound codes | Percentages by weight (%) | Performance parameters | Parameter values |
|---|---|---|---|
| 2PGP3 | 4 | $\Delta n$ | 0.097 |
| 3CCV | 43 | $\Delta\varepsilon$ | +2.5 |
| 3CCV1 | 12 | Cp | 78 |
| 5PP1 | 4 | $\gamma 1$ | 53 |
| 2PGUF | 6 | $K_{11}$ | 13.8 |
| 3PGUF | 5 | $K_{22}$ | 6.9 |
| VCCP1 | 11 | $K_{33}$ | 14.6 |
| V2CCP1 | 10 | | |
| 3CPGUOCF$_3$ | 5 | | |

The values of the performance parameters of the liquid crystal compositions obtained in example 1 and comparative example 1 are summarized and compared, and reference can be made to table 29.

TABLE 29

Comparison of performance parameters of liquid crystal compositions

| | $\Delta n$ | $\Delta\varepsilon$ | Cp | $\gamma 1$ | $K_{11}$ | $K_{22}$ | $K_{33}$ |
|---|---|---|---|---|---|---|---|
| Example 1 | 0.098 | +2.6 | 81 | 50 | 13.9 | 7.0 | 15.6 |
| Comparative example 1 | 0.097 | +2.5 | 78 | 53 | 13.8 | 6.9 | 14.6 |

Upon comparison, it can be seen that, as compared with comparative example 1, the liquid crystal composition provided in example 1 has a low rotational viscosity, i.e. having a faster response time.

Comparative Example 3

TABLE 30

Percentages by weight of each component and performance parameters of the liquid crystal composition

| Compound codes | Percentages by weight (%) | Performance parameters | Parameter values |
|---|---|---|---|
| 3PUQUF | 7 | $\Delta n$ | 0.100 |
| 3CUQUF | 7 | $\Delta\varepsilon$ | +5.6 |
| 2PGUF | 7 | Cp | 90 |
| 3CCV | 35 | $\gamma 1$ | 90 |
| 3CCV1 | 8 | $K_{11}$ | 12.8 |
| VCCP1 | 10 | $K_{22}$ | 6.5 |
| V2CCP1 | 6 | $K_{33}$ | 16.2 |
| 2PGP3 | 4 | | |
| 2CCPUF | 5 | | |
| 3CCPUF | 5 | | |
| 3CPPC3 | 4 | | |
| 3CGPC3 | 2 | | |

The values of the performance parameters of the liquid crystal compositions obtained in example 5 and comparative example 2 are summarized and compared, and reference can be made to table 31.

TABLE 31

Comparison of performance parameters of liquid crystal compositions

| | $\Delta n$ | $\Delta\varepsilon$ | Cp | $\gamma 1$ | $K_{11}$ | $K_{22}$ | $K_{33}$ |
|---|---|---|---|---|---|---|---|
| Example 5 | 0.101 | +5.8 | 91 | 62 | 13.8 | 6.9 | 17.1 |
| Comparative example 2 | 0.100 | +5.6 | 90 | 90 | 12.8 | 6.5 | 16.2 |

Upon comparison, it can be seen that, as compared with comparative example 2, the liquid crystal composition provided in example 5 has a large elastic constant and a low rotational viscosity, and therefore has a shorter response time and a faster response speed.

It can be seen from the above examples that the liquid crystal composition provided by the present invention simultaneously contains a compound containing 2-methyl-3,4,5-trifluorobenzene linked to a difluoromethoxy bridge bond and a non-polar bicyclic compound, has a low viscosity, high resistivity, suitable optical anisotropy, large elastic constant and excellent light stability and thermal stability, and can reduce the response time of the liquid crystal display, thereby solving the problem of a slow response speed of the liquid crystal display. Therefore, the liquid crystal composition provided by the present invention is suitable for fast-response TN, IPS and FFS-type TFT liquid crystal display devices, is particularly suitable for IPS and FFS liquid crystal display devices, and is especially suitable for quick-response liquid crystal display devices.

Although the present invention has been described in detail with general explanations and specific embodiments, it is obvious to a person skilled in the art that some modifications or improvements can be made thereto based on the present invention. Therefore, all these modifications and improvements which can be made without departing from the scope of the present invention belong to the scope claimed in the invention.

INDUSTRIAL APPLICABILITY

The present invention provides a liquid crystal composition, which liquid crystal composition simultaneously contains a compound containing 2-methyl-3,4,5-trifluorobenzene linked to a difluoromethoxy bridge bond and a non-polar bicyclic compound, has a low viscosity, high resistivity, suitable optical anisotropy, large elastic constant and excellent light stability and thermal stability, and can reduce the response time of the liquid crystal display, thereby solving the problem of a slow response speed of the liquid crystal display. Therefore, the liquid crystal composition provided by the present invention is suitable for fast-response TN, IPS and FFS-type TFT liquid crystal display devices, is particularly suitable for IPS and FFS liquid crystal display devices, and is especially suitable for quick-response liquid crystal display devices, and has broad application prospects and a good industrial applicability in the liquid crystal display field.

The invention claimed is:

1. A liquid crystal composition comprising, in percentages by weight, 1-50% of one or more compounds represented by general formula I, 10-70% of one or more compounds represented by general formula II, and 2-30% by weight of one or more compounds represented by general formula III,

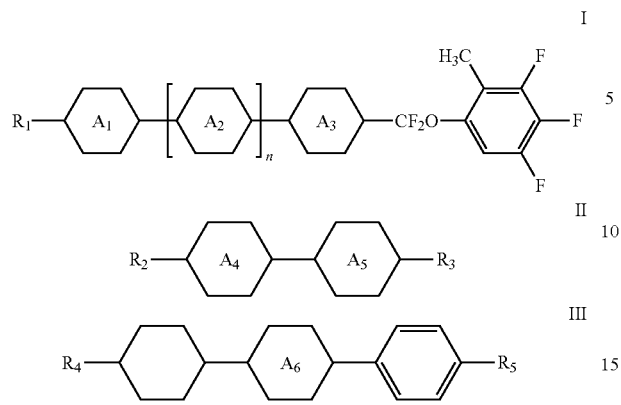

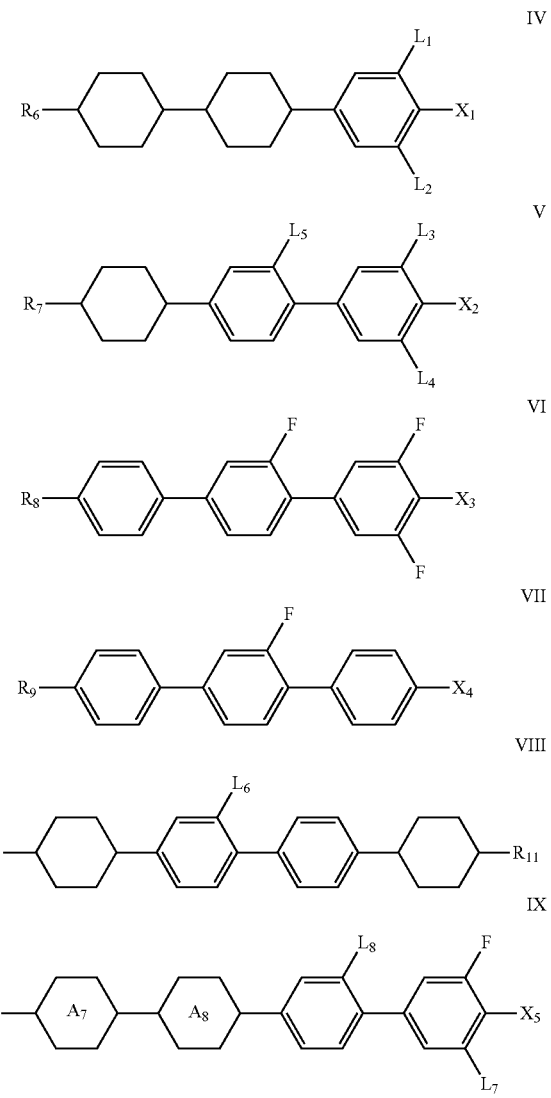

wherein $R_1$, $R_2$ and $R_3$ each independently represent a $C_1$-$C_{12}$ linear alkyl group or a $C_1$-$C_{12}$ linear alkyl group having one or more non-adjacent $CH_2$ substituted with O, S or CH=CH;
n each independently represents 0 or 1;
$A_1$, $A_2$ and $A_3$ each independently represent the following structures:

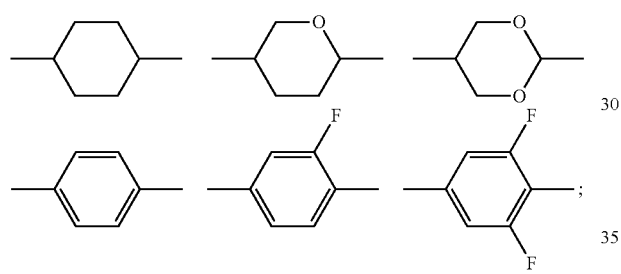

and
$A_4$ and $A_5$ each independently represent a trans-1,4-cyclohexylene group or a 1,4-phenylene group;
wherein $R_4$ and $R_5$ each independently represent a $C_1$-$C_{12}$ linear alkyl group or a $C_1$-$C_{12}$ linear alkyl group having one or more non-adjacent $CH_2$ substituted with O, S or CH=CH; and
$A_6$ each independently represents the following structures:

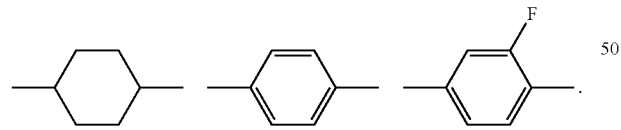

2. The liquid crystal composition according to claim 1, comprising, in percentages by weight, 3-20% of one or more compounds represented by general formula I, and 17-63% of one or more compounds represented by general formula II; or comprising 21-45% of one or more compounds represented by general formula I, and 20-45% of one or more compounds represented by general formula II.

3. The liquid crystal composition according to claim 1, wherein the amount of the one or more compounds represented by general formula III is 10-26% by weight.

4. The liquid crystal composition according to claim 1, further comprising 6-45% by weight of one or more compounds represented by general formulas IV to IX, wherein $R_6$ and $R_9$ each independently represent a $C_1$-$C_{12}$ linear alkyl group or a $C_1$-$C_{12}$ linear alkyl group having one or more non-adjacent $CH_2$ substituted with CH=CH; $R_7$, $R_8$ and $R_{10}$-$R_{12}$ each independently represent a $C_1$-$C_{12}$ linear alkyl group; $L_1$-$L_8$ each independently represent H or F; $X_1$-$X_3$ and $X_5$ each independently represent F, $CF_3$, $OCF_2H$ or $OCF_3$; $X_4$ each independently represents F, $CF_3$, $OCF_3$, and a $C_1$-$C_5$ linear alkyl group or a $C_2$-$C_5$ linear alkenyl group; and $A_7$ and $A_8$ are each independently selected from the following structures:

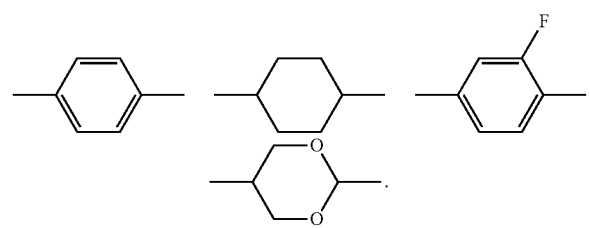

5. The liquid crystal composition according to claim 4, wherein the amount of the one or more compounds represented by general formulas IV to IX is 28-37%.

6. The liquid crystal composition according to claim 4, comprising, in percentages by weight,
- 6-39% of one or more compounds represented by general formula I,
- 22-62% of one or more compounds represented by general formula II,
- 2-26% of one or more compounds represented by general formula III, and
- 6-44% of one or more compounds represented by general formulas IV to IX.

7. The liquid crystal composition according to claim 1, wherein the compound represented by general formula I is selected from one or more of the compounds represented by formulas I-A to I-U:

I-A

I-B

I-C

I-D

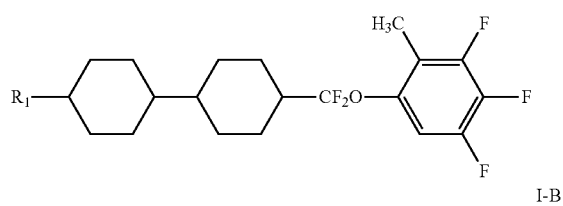

I-E

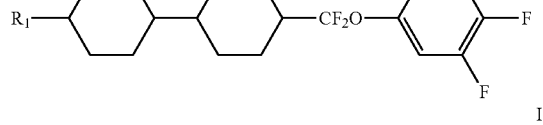

I-F

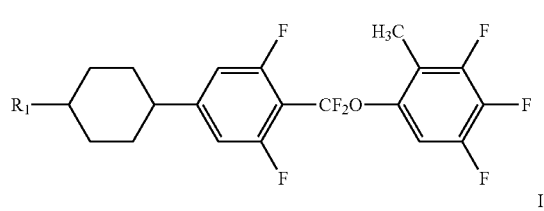

-continued

I-G

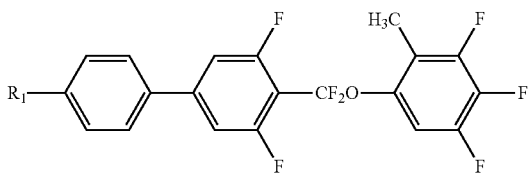

I-H

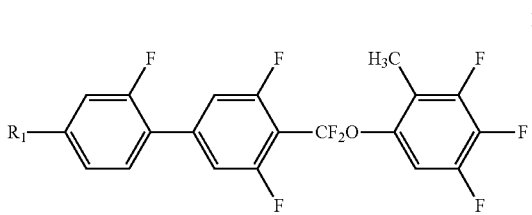

I-I

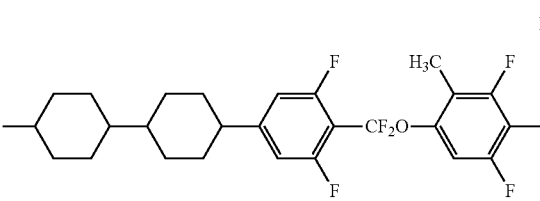

I-J

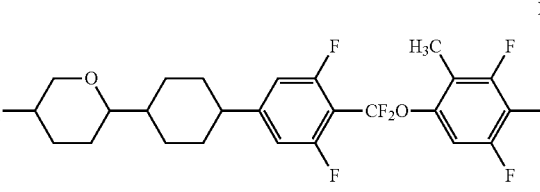

I-K

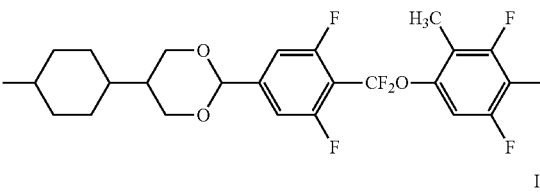

I-L

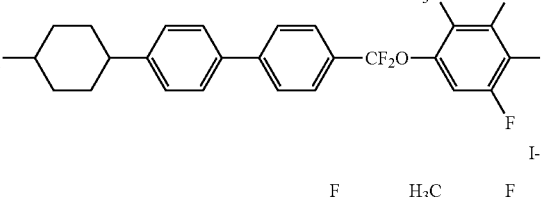

I-M

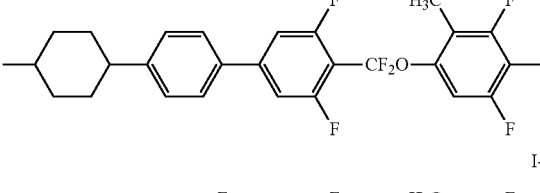

I-N

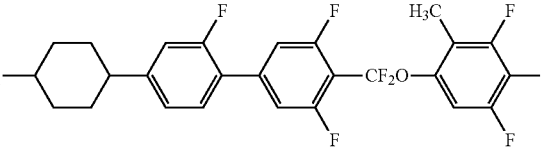

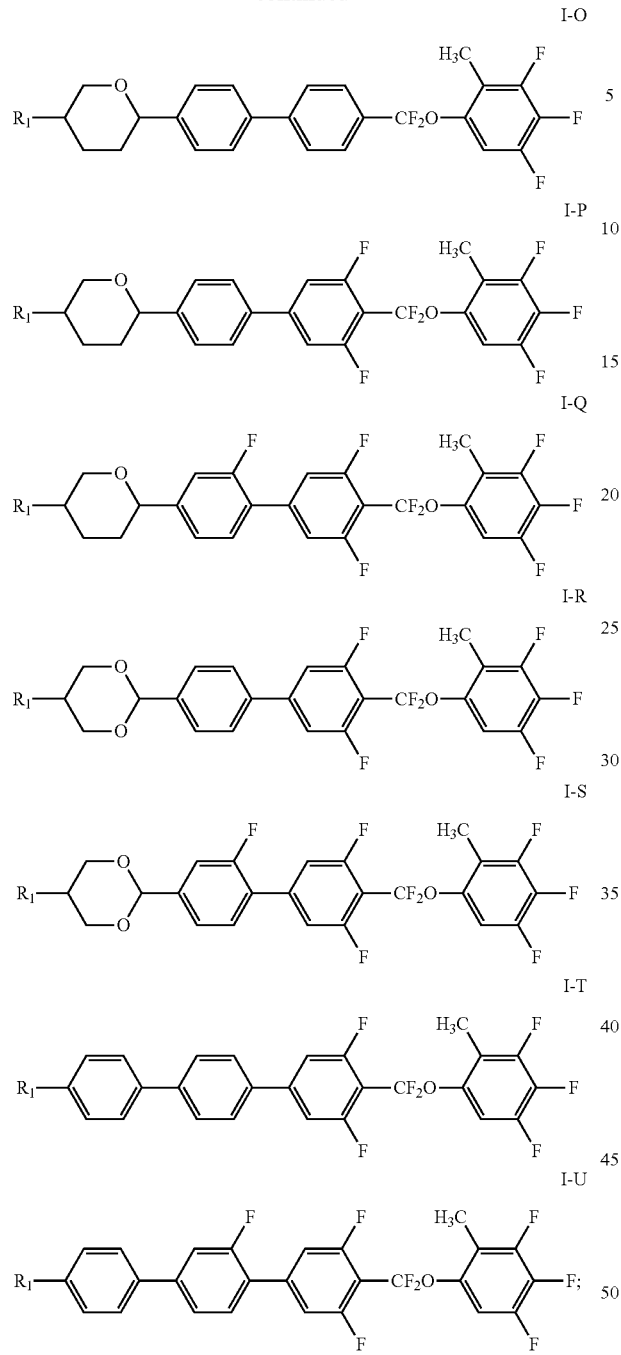

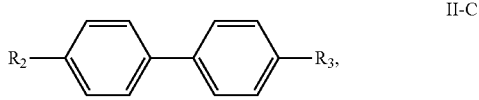

wherein $R_1$ each independently represents a $C_1$-$C_7$ linear alkyl group; $R_2$ each independently represents a $C_1$-$C_7$ linear alkyl group or linear alkoxy group or a $C_2$-$C_7$ linear alkenyl group; and $R_3$ each independently represents a $C_1$-$C_7$ linear alkyl group.

8. The liquid crystal composition according to claim 4, wherein the compound represented by general formula I is selected from one or more of the compounds represented by formulas I-A-1 to I-U-4:

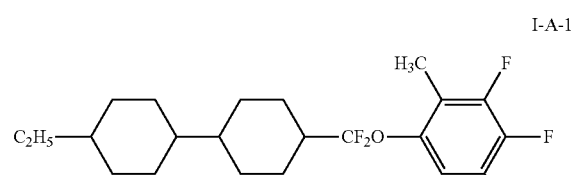

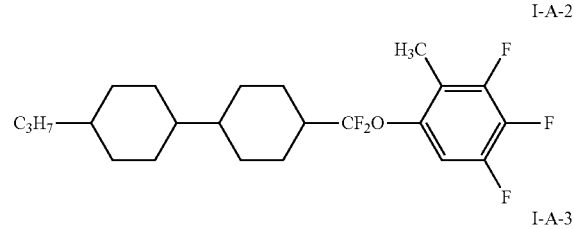

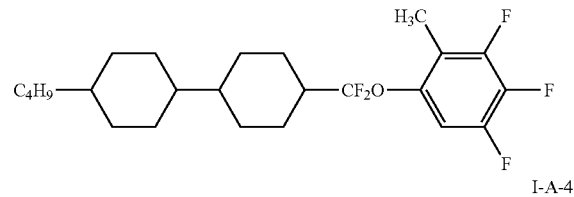

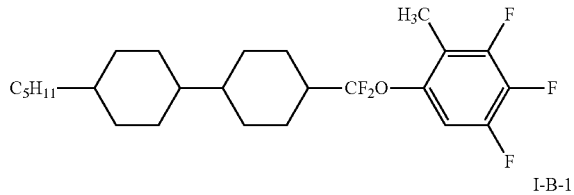

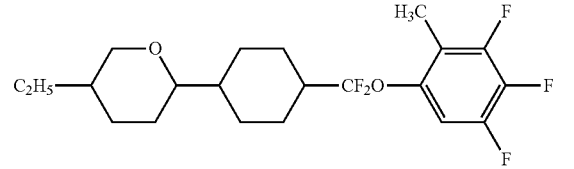

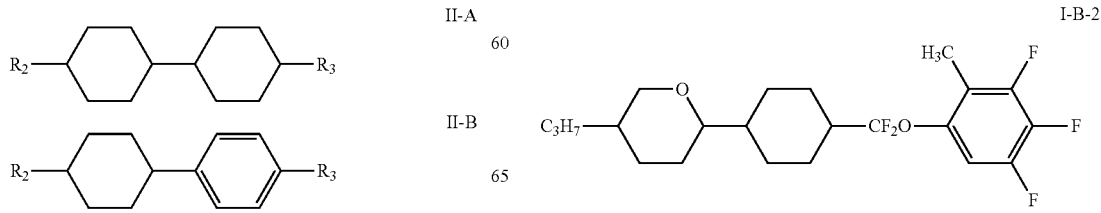

I-B-3
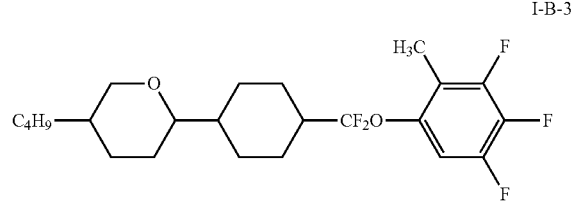
I-B-4
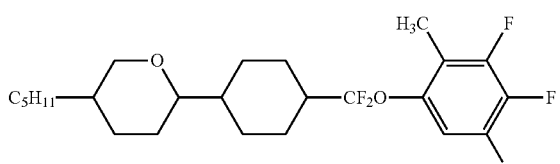
I-C-1
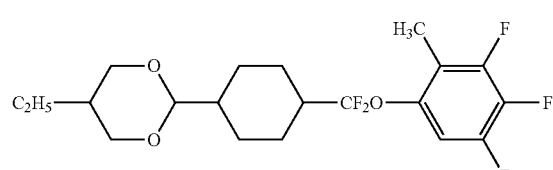
I-C-2
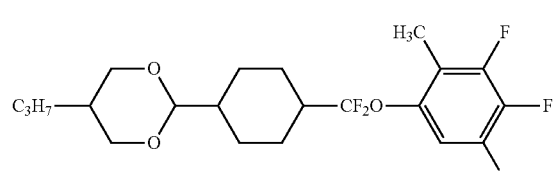
I-C-3
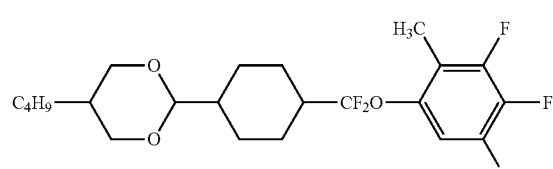
I-C-4
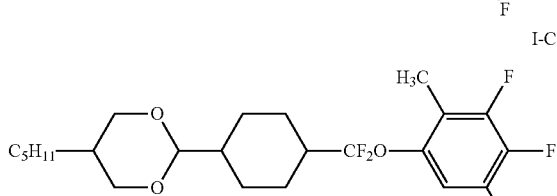
I-D-1
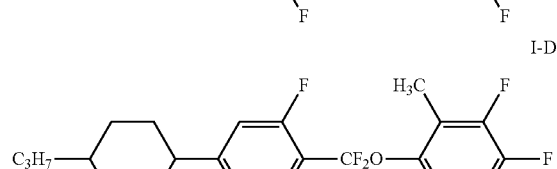
I-D-2
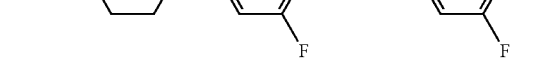
I-D-3
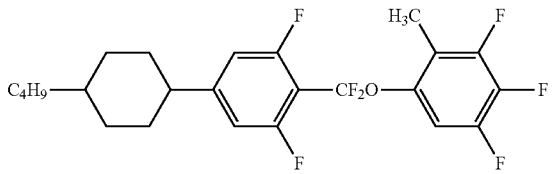
I-D-4
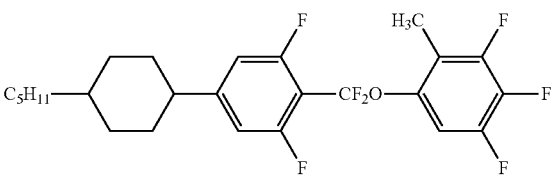
I-E-1
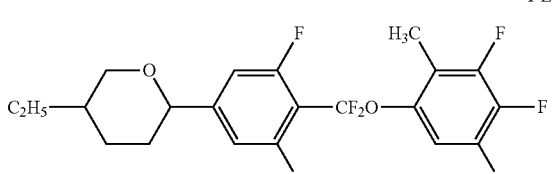
I-E-2
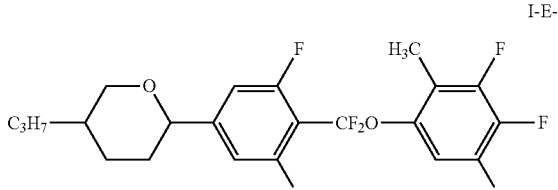
I-E-3
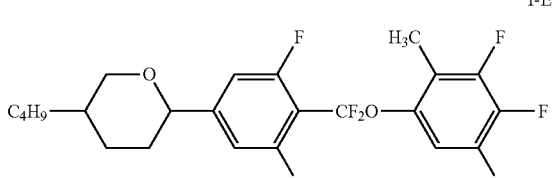
I-E-4
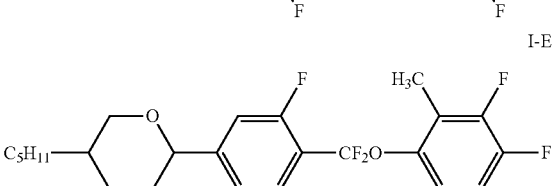
I-F-1
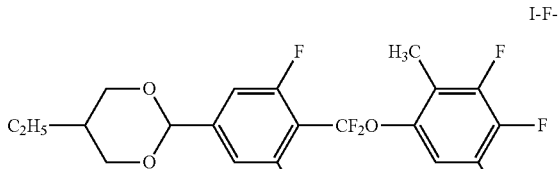
I-F-2
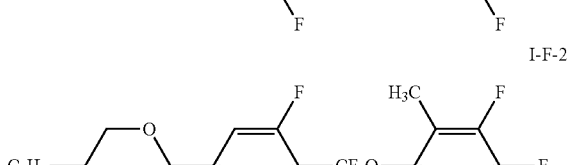

-continued
I-F-3
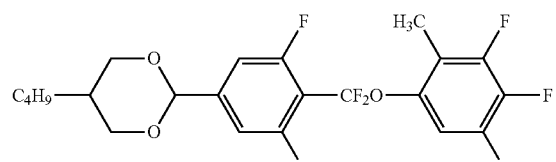
I-F-4
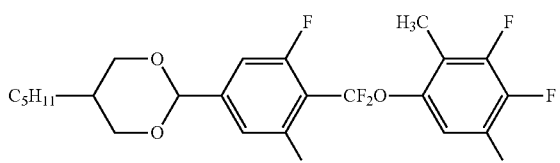
I-G-1
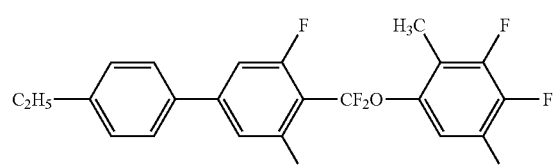
I-G-2
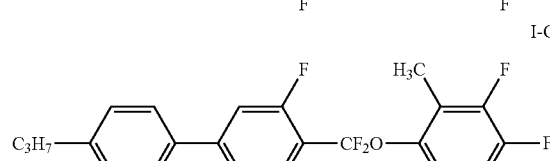
I-G-3
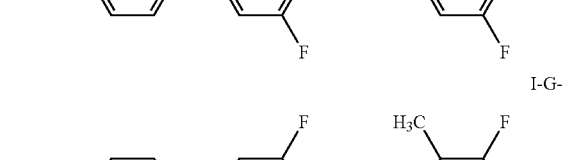
I-G-4
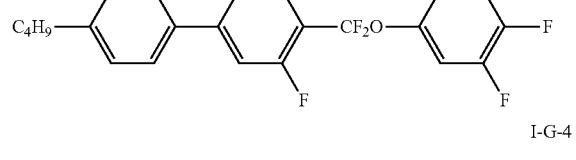
I-H-1
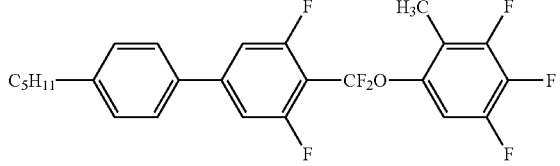
I-H-2
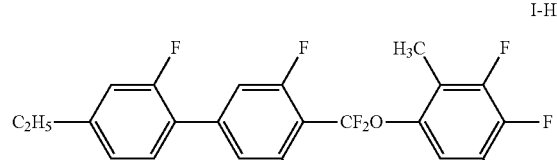
-continued
I-H-3
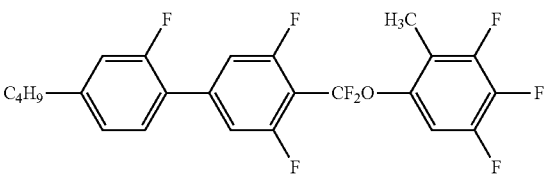
I-H-4
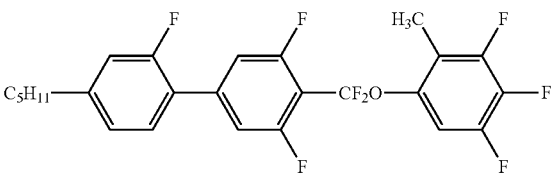
I-I-1
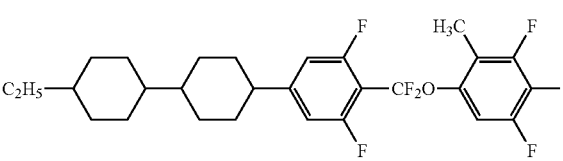
I-I-2
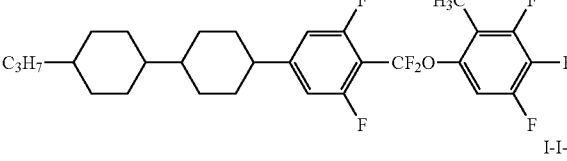
I-I-3
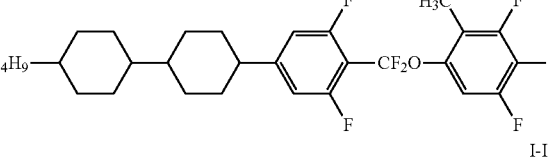
I-I-4
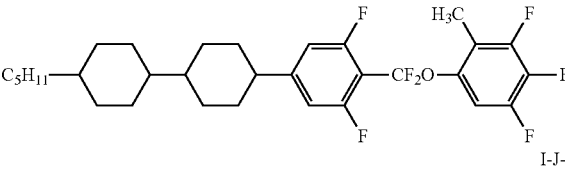
I-J-1
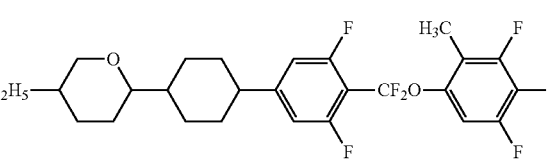
I-J-2
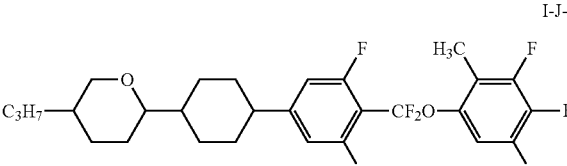
I-J-3
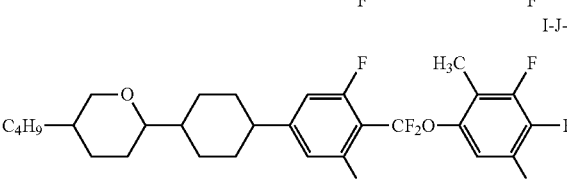

I-J-4
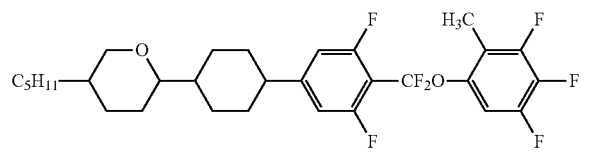
I-K-1
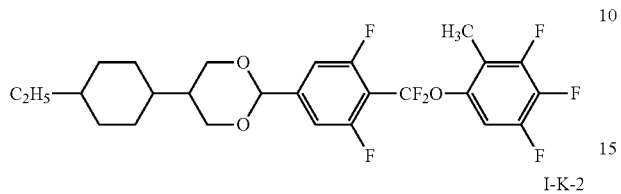
I-K-2
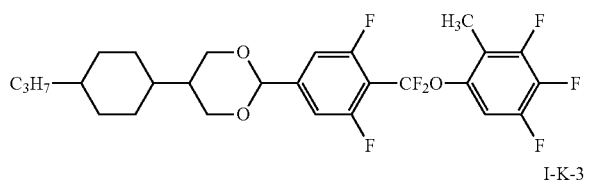
I-K-3
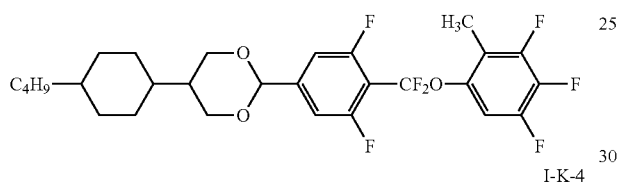
I-K-4
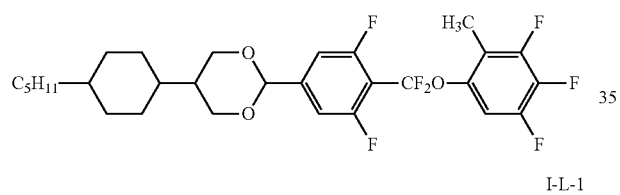
I-L-1
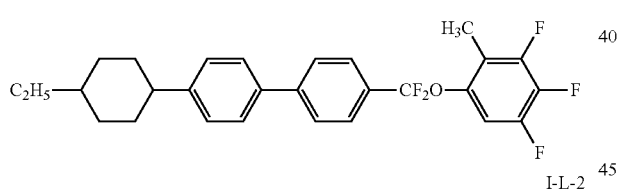
I-L-2
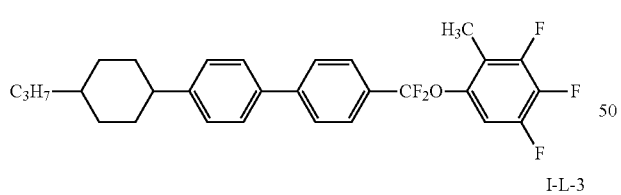
I-L-3
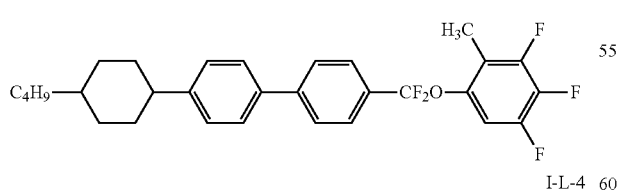
I-L-4
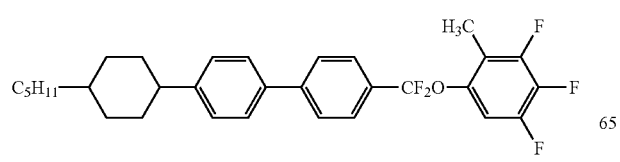
I-M-1
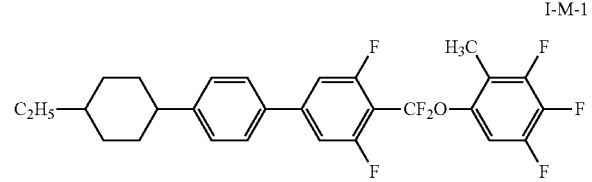
I-M-2
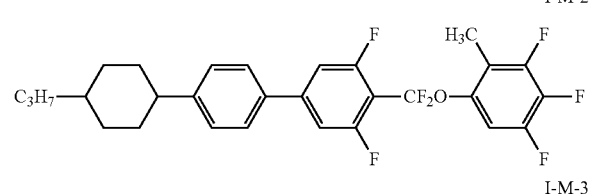
I-M-3
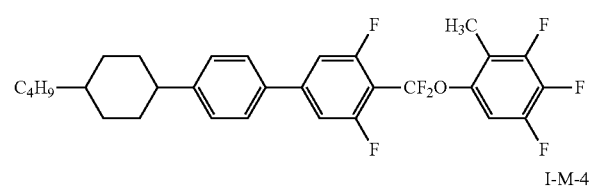
I-M-4
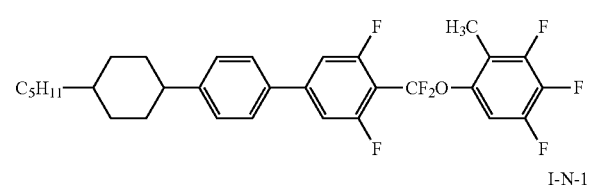
I-N-1
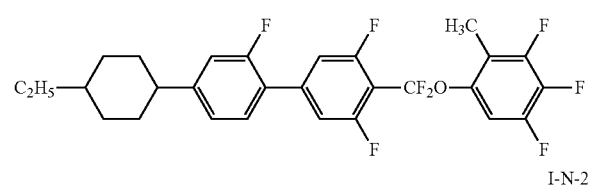
I-N-2
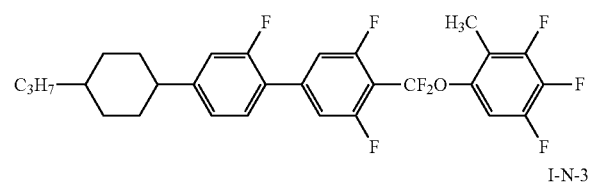
I-N-3
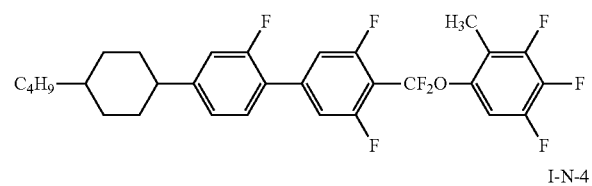
I-N-4
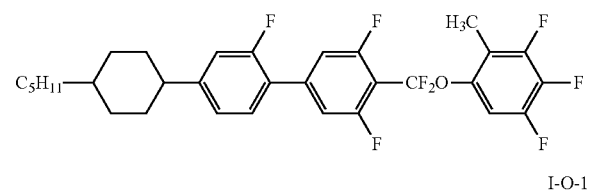
I-O-1
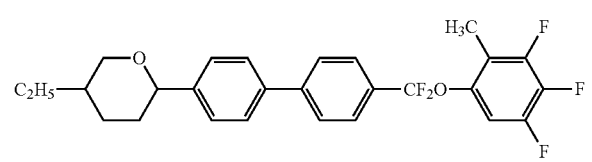

I-O-2
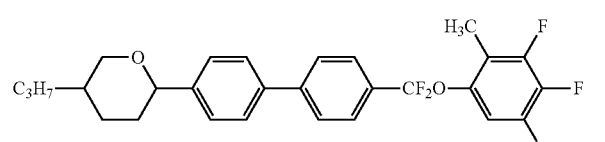
I-O-3
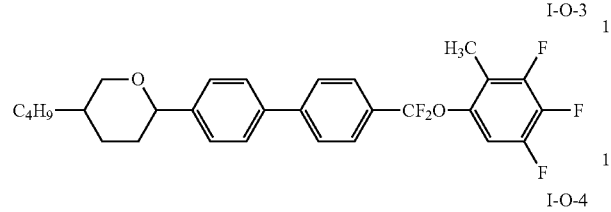
I-O-4
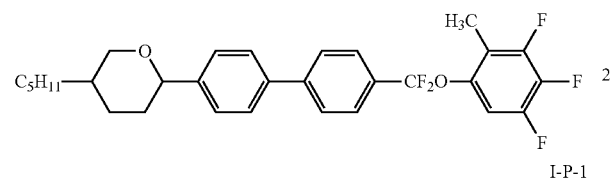
I-P-1
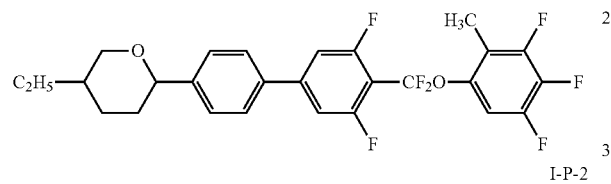
I-P-2
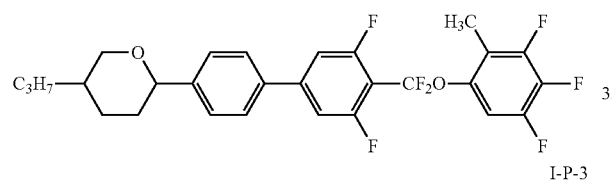
I-P-3
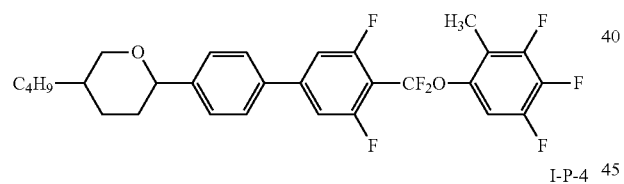
I-P-4
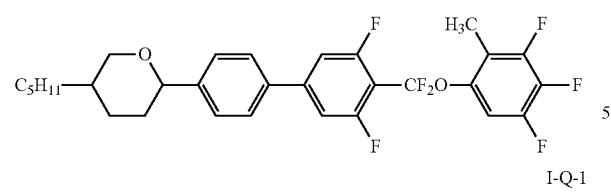
I-Q-1
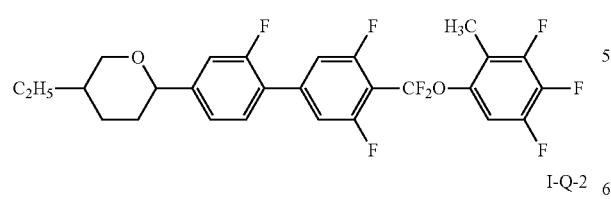
I-Q-2
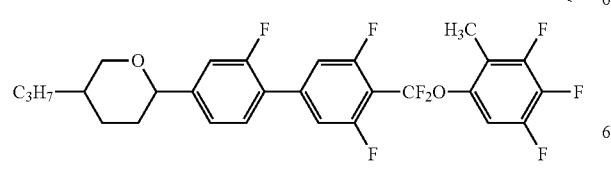
I-Q-3
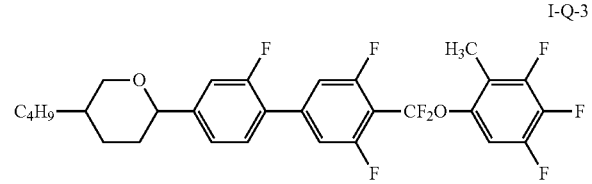
I-Q-4
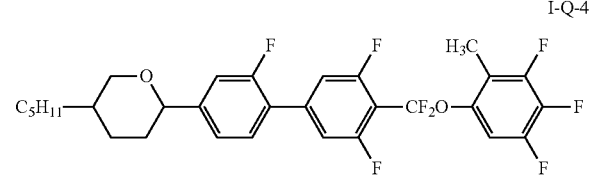
I-R-1
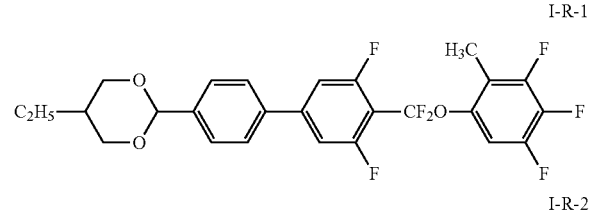
I-R-2
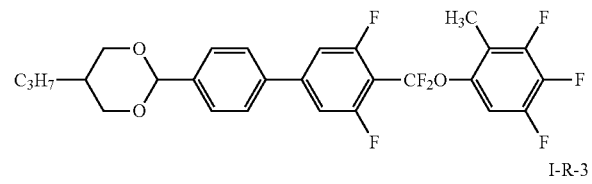
I-R-3
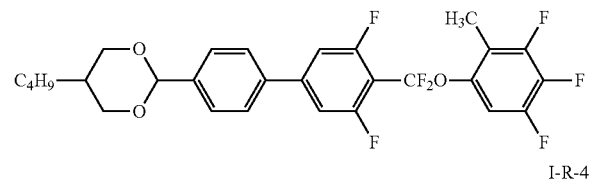
I-R-4
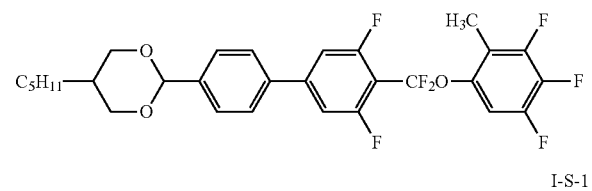
I-S-1
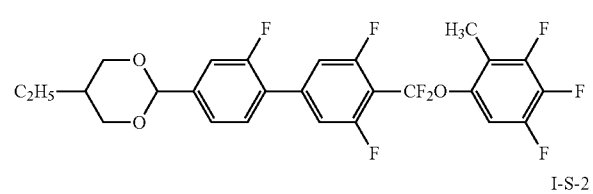
I-S-2
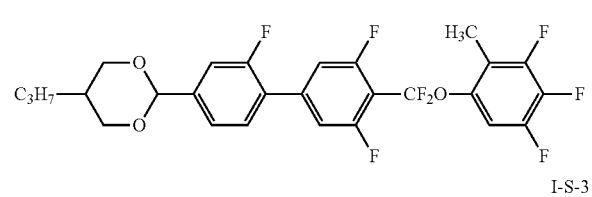
I-S-3
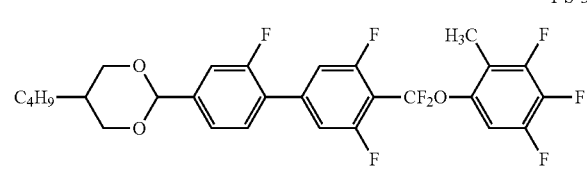

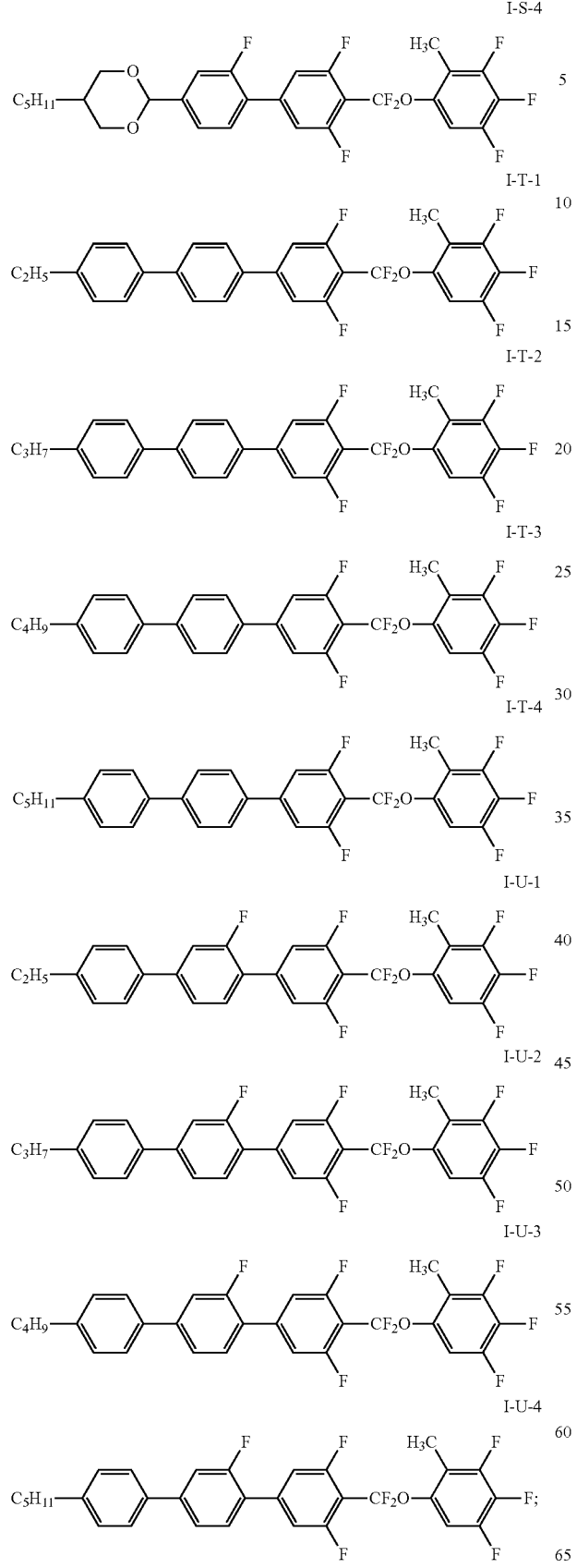
the compound represented by general formula II is selected from one or more of the compounds represented by formulas II-A-1 to II-C-24:
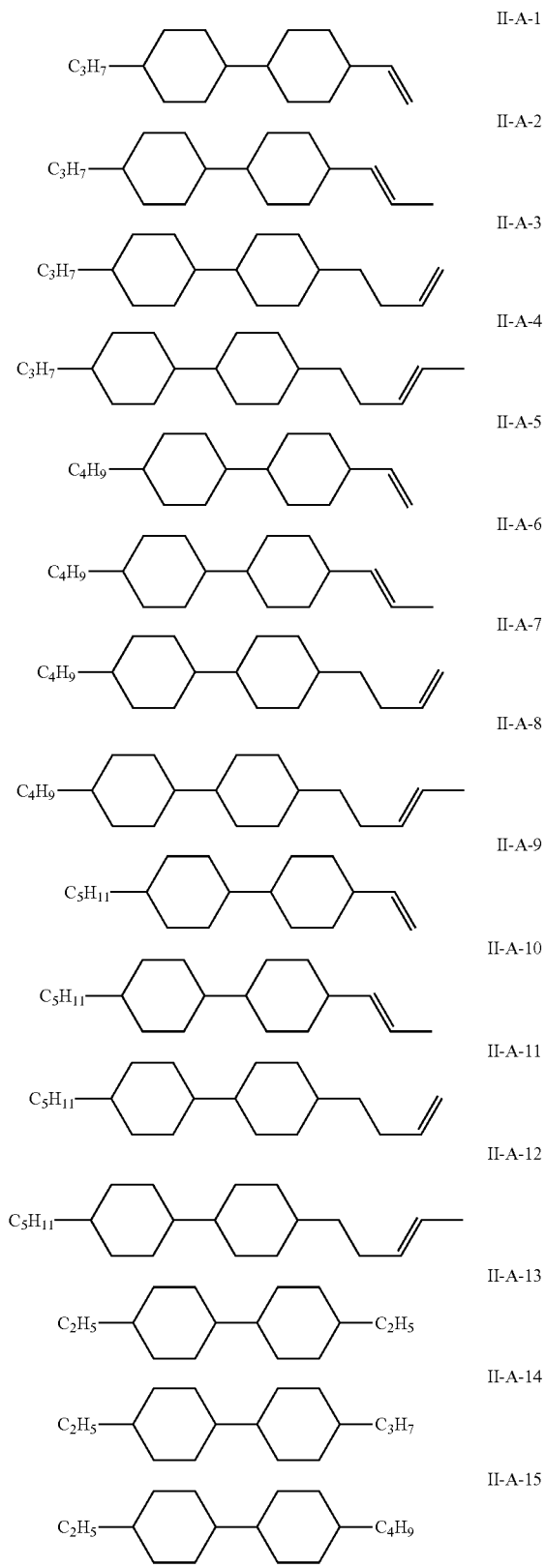

| Structure | ID |
|---|---|
| C₂H₅—[Cy]—[Cy]—C₅H₁₁ | II-A-16 |
| C₃H₅—[Cy]—[Cy]—C₃H₇ | II-A-17 |
| C₃H₅—[Cy]—[Cy]—C₄H₉ | II-A-18 |
| C₃H₅—[Cy]—[Cy]—C₅H₁₁ | II-A-19 |
| C₄H₉—[Cy]—[Cy]—C₄H₉ | II-A-20 |
| C₄H₉—[Cy]—[Cy]—C₅H₁₁ | II-A-21 |
| C₅H₁₁—[Cy]—[Cy]—C₅H₁₁ | II-A-22 |
| C₂H₅—[Cy]—[Cy]—OCH₃ | II-A-23 |
| C₃H₇—[Cy]—[Cy]—OCH₃ | II-A-24 |
| C₄H₉—[Cy]—[Cy]—OCH₃ | II-A-25 |
| C₅H₁₁—[Cy]—[Cy]—OCH₃ | II-A-26 |
| C₂H₅—[Cy]—[Cy]—OC₂H₅ | II-A-27 |
| C₃H₇—[Cy]—[Cy]—OC₂H₅ | II-A-28 |
| C₄H₉—[Cy]—[Cy]—OC₂H₅ | II-A-29 |
| C₅H₁₁—[Cy]—[Cy]—OC₂H₅ | II-A-30 |
| C₂H₅—[Cy]—[Ph]—C₂H₅ | II-B-1 |
| C₂H₅—[Cy]—[Ph]—C₃H₇ | II-B-2 |
| C₂H₅—[Cy]—[Ph]—C₄H₉ | II-B-3 |
| C₂H₅—[Cy]—[Ph]—C₅H₁₁ | II-B-4 |
| C₃H₇—[Cy]—[Ph]—C₂H₅ | II-B-5 |
| C₃H₇—[Cy]—[Ph]—C₃H₇ | II-B-6 |
| C₃H₇—[Cy]—[Ph]—C₄H₉ | II-B-7 |
| C₃H₇—[Cy]—[Ph]—C₅H₁₁ | II-B-8 |
| C₄H₉—[Cy]—[Ph]—C₂H₅ | II-B-9 |
| C₄H₉—[Cy]—[Ph]—C₃H₇ | II-B-10 |
| C₄H₉—[Cy]—[Ph]—C₄H₉ | II-B-11 |
| C₄H₉—[Cy]—[Ph]—C₅H₁₁ | II-B-12 |
| C₅H₁₁—[Cy]—[Ph]—C₂H₅ | II-B-13 |
| C₅H₁₁—[Cy]—[Ph]—C₃H₇ | II-B-14 |
| C₅H₁₁—[Cy]—[Ph]—C₄H₉ | II-B-15 |
| C₅H₁₁—[Cy]—[Ph]—C₅H₁₁ | II-B-16 |
| C₂H₅—[Cy]—[Ph]—OCH₃ | II-B-17 |

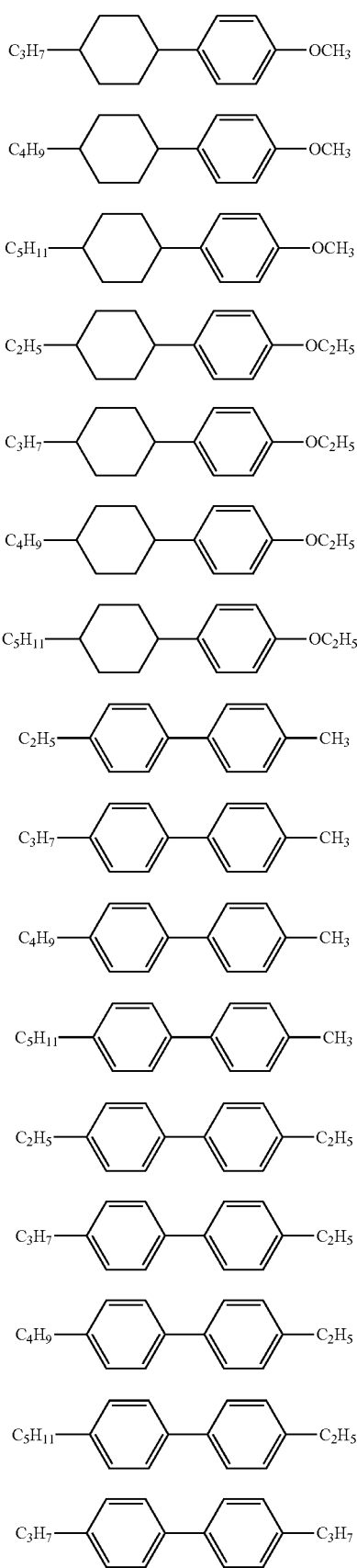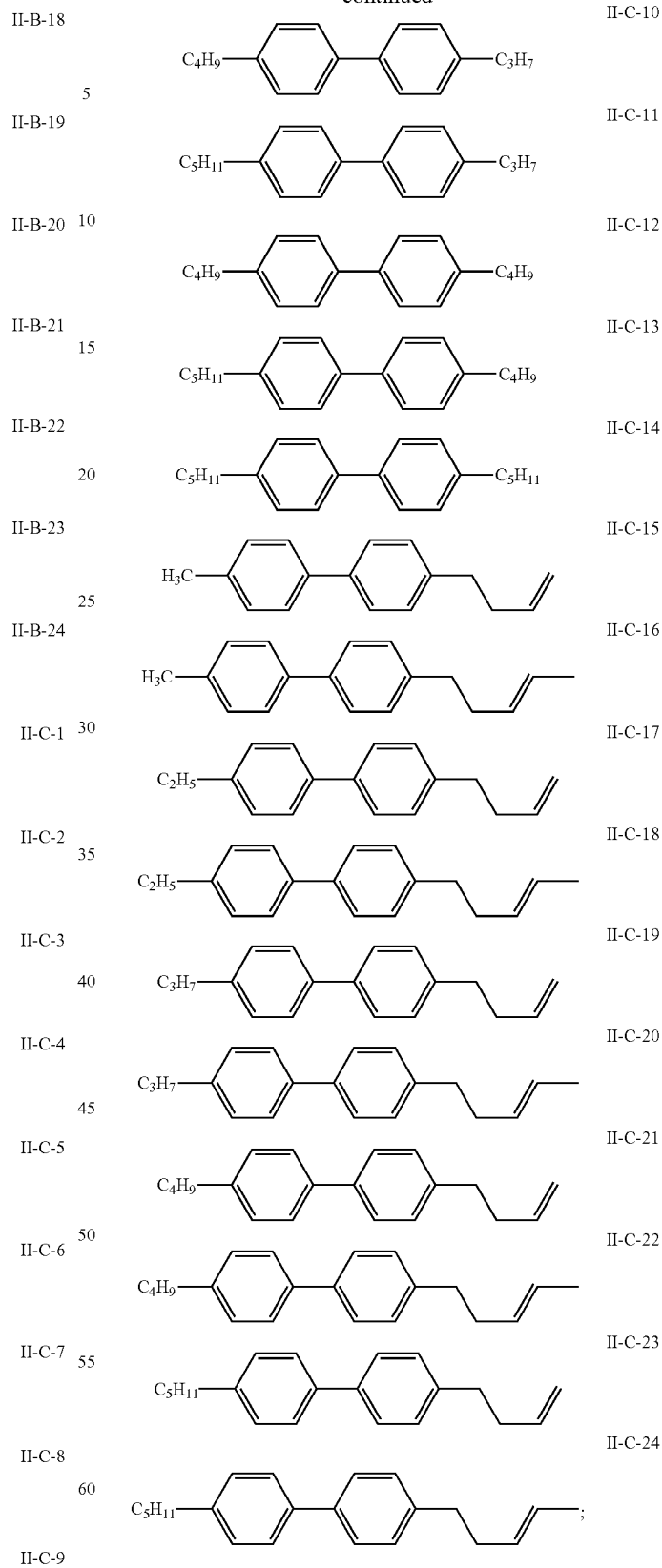
the compound represented by general formula III is selected from one or more of the structures of formulas III-A-1 to III-C-30:

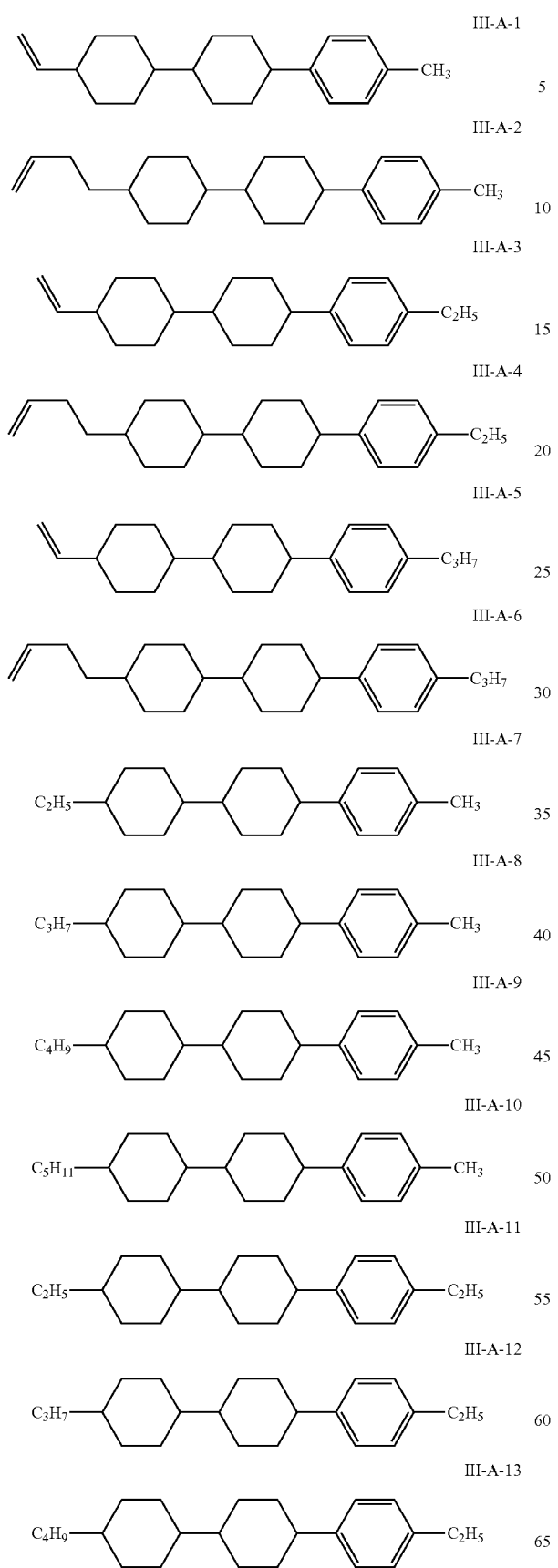
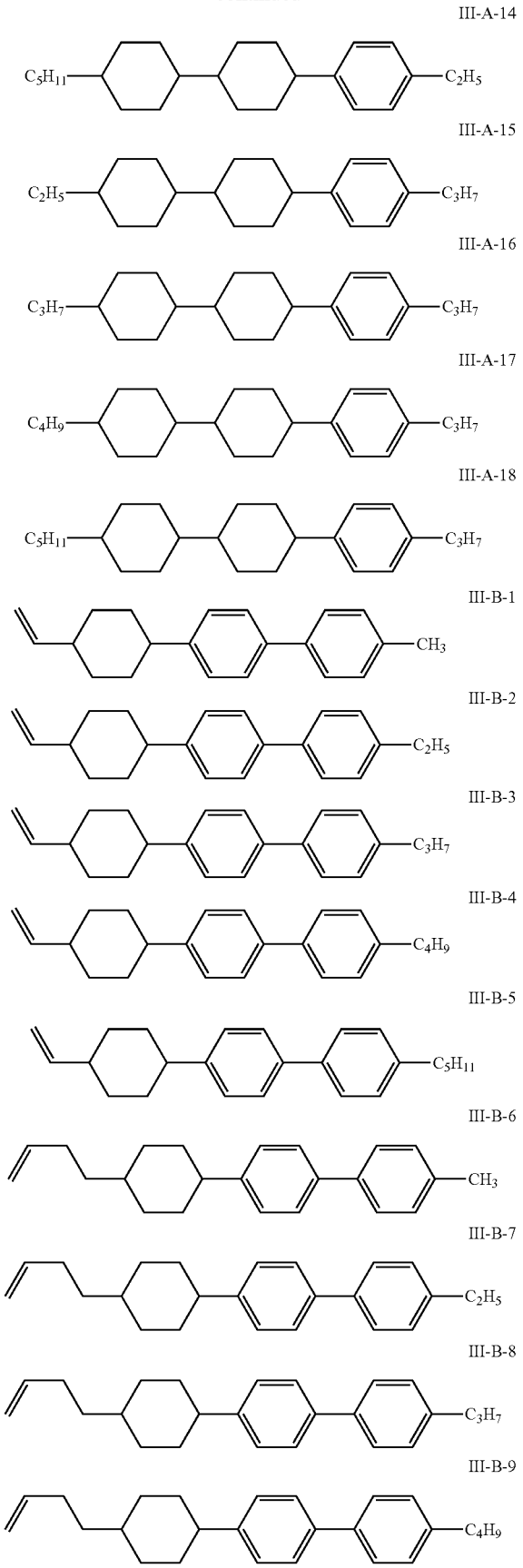

III-B-10
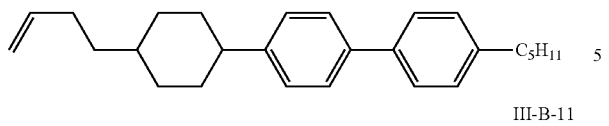
III-B-11
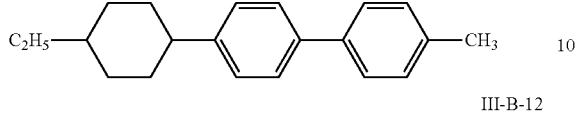
III-B-12
III-B-13
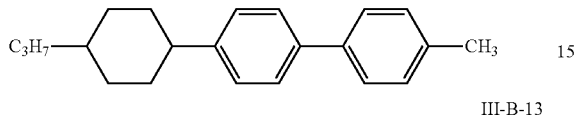
III-B-14
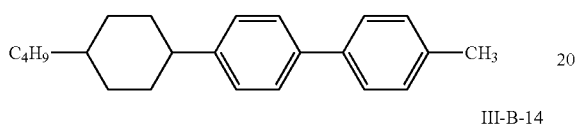
III-B-15
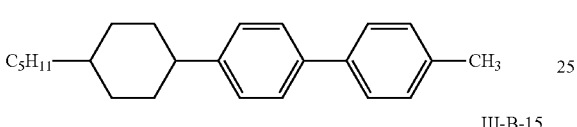
III-B-16
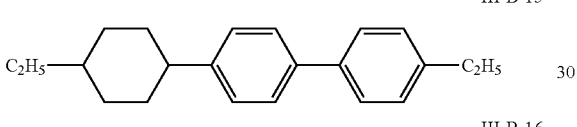
III-B-17
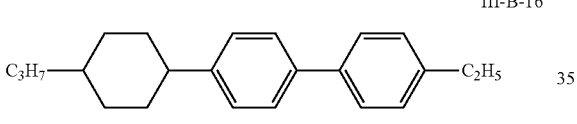
III-B-18
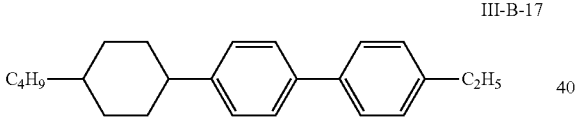
III-B-19
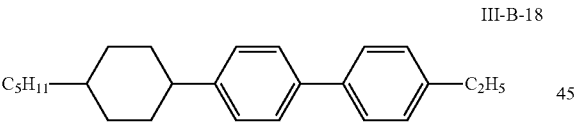
III-B-20
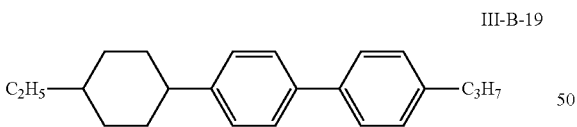
III-B-21
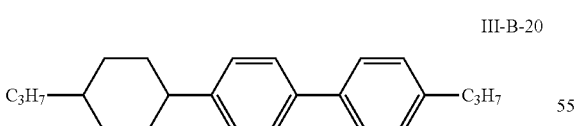
III-B-22
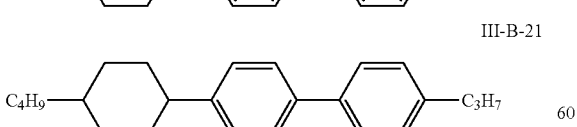
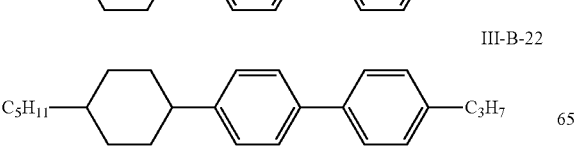
III-C-1
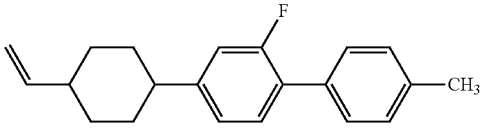
III-C-2
III-C-3
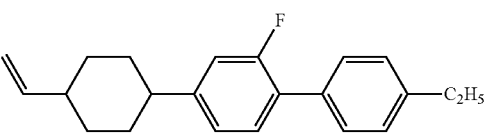
III-C-4
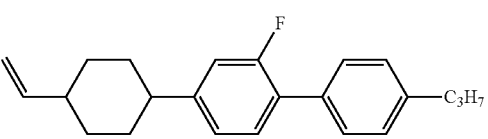
III-C-5
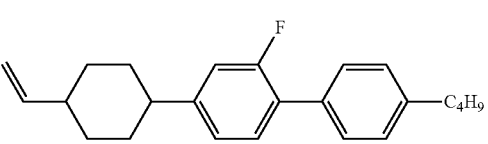
III-C-6
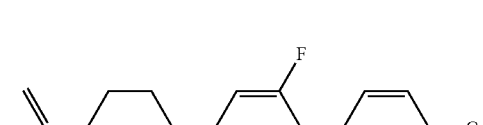
III-C-7
III-C-8
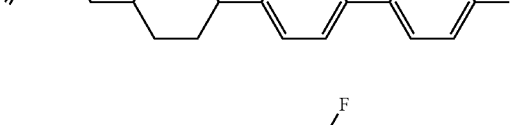
III-C-9
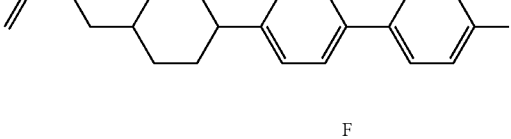
III-C-10
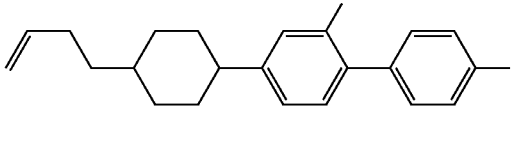
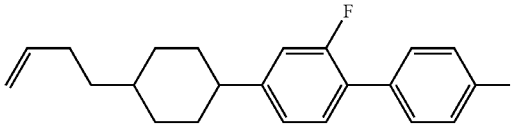

III-C-11
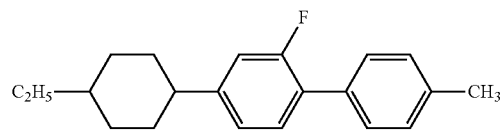
III-C-12
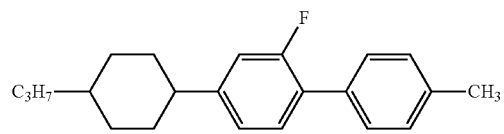
III-C-13
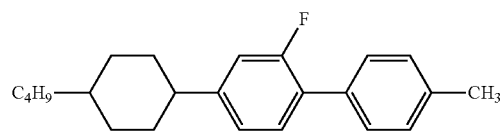
III-C-14
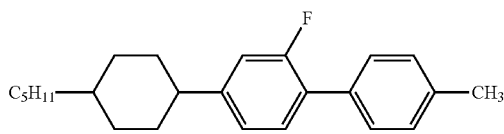
III-C-15
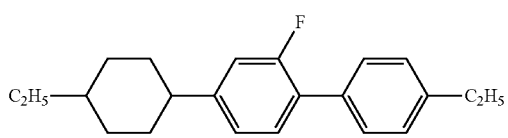
III-C-16
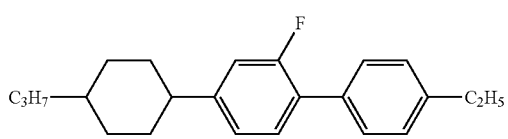
III-C-17
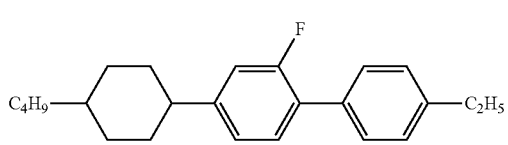
III-C-18
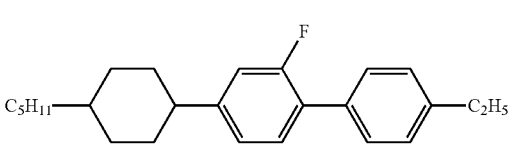
III-C-19
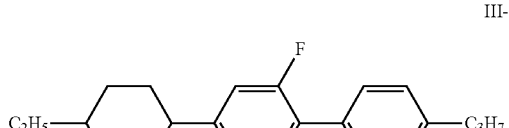
III-C-20
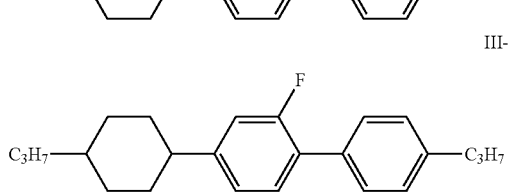
III-C-21
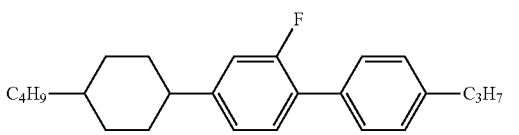
III-C-22
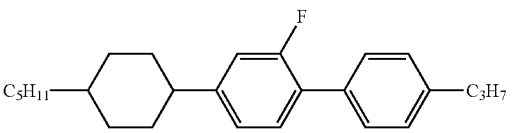
III-C-23
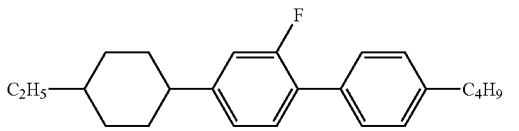
III-C-24
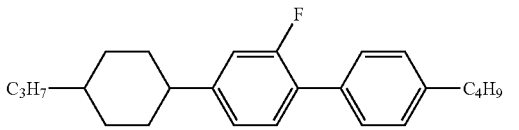
III-C-25
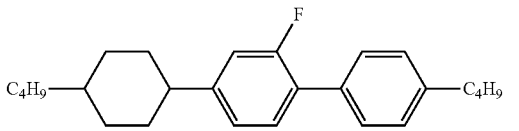
III-C-26
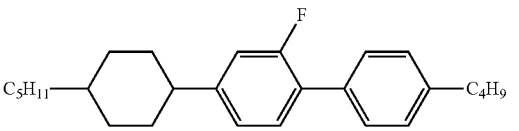
III-C-27
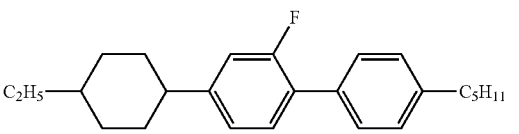
III-C-28
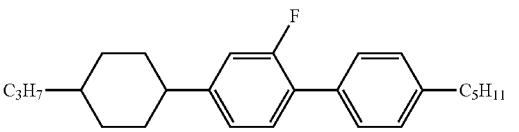
III-C-29
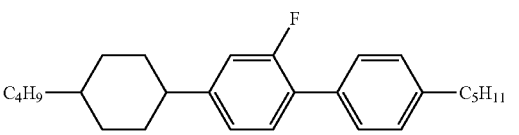
III-C-30
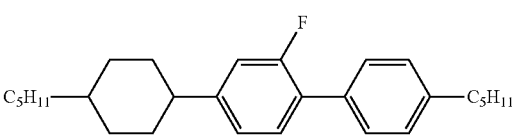

the compounds of general formulas IV to IX are selected from one or more of the following structures:
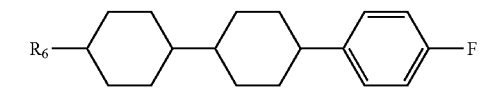
IV-A
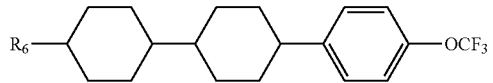
IV-B
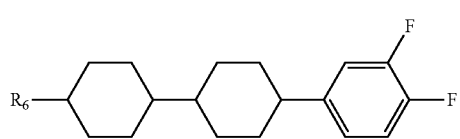
IV-C
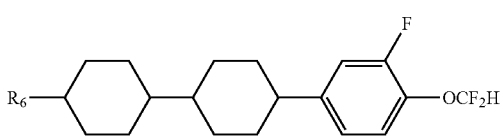
IV-D
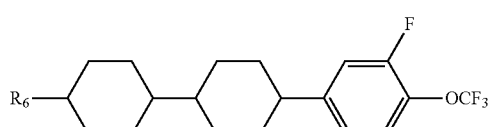
IV-E
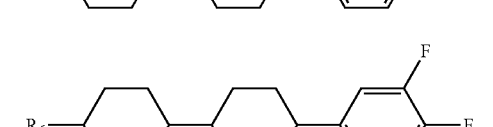
IV-F
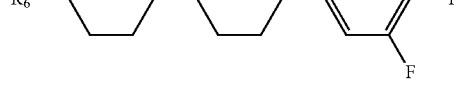
IV-G
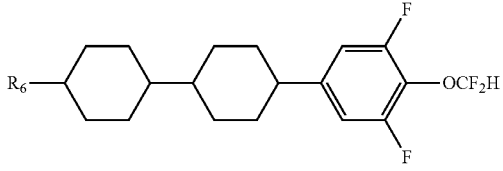
IV-H
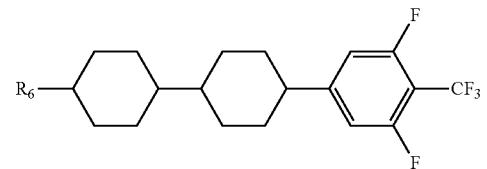
IV-I
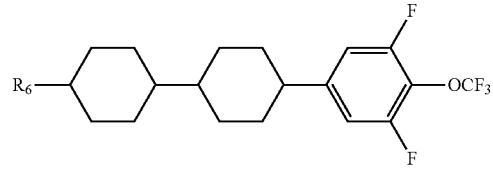
V-A
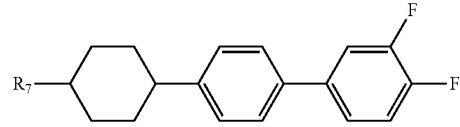
V-B
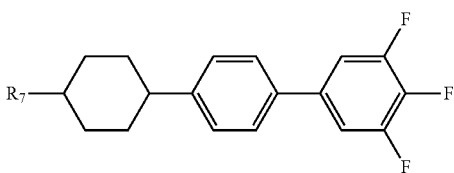
V-C
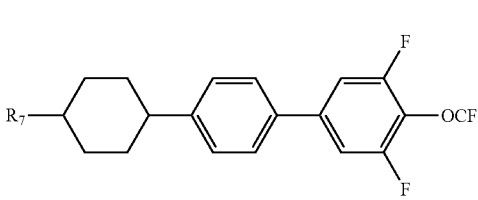
V-D
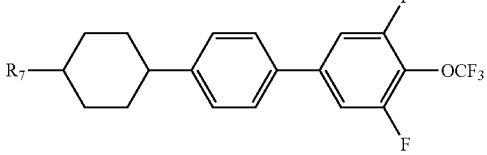
V-E
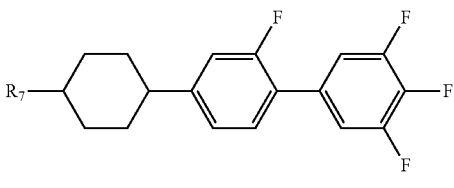
VI-A
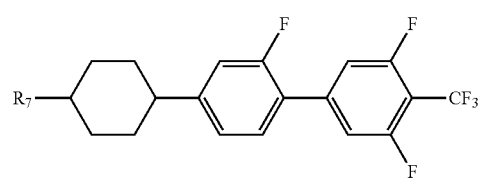
VI-B
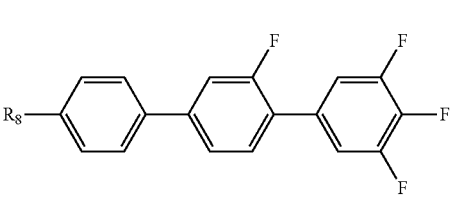
VI-C
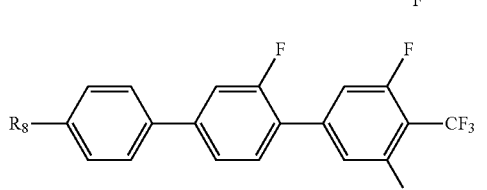
VII-A
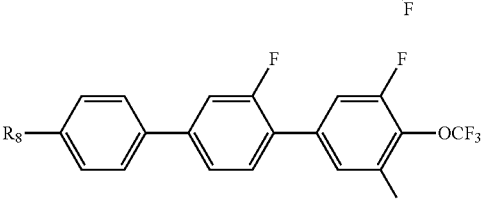
VII-B
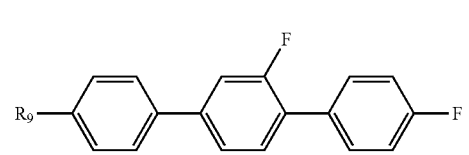
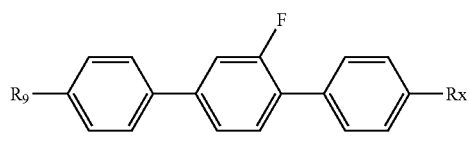

-continued

VIII-A
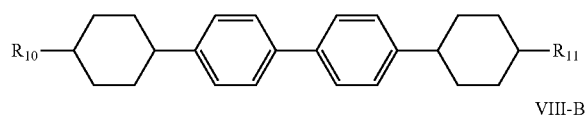

VIII-B
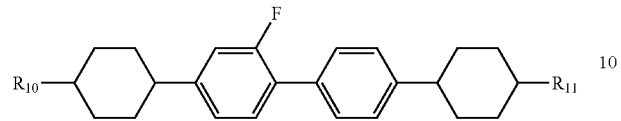

IX-A
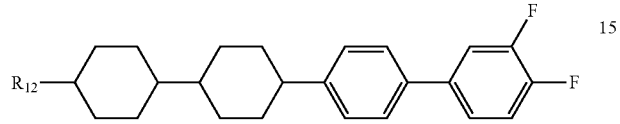

IX-B
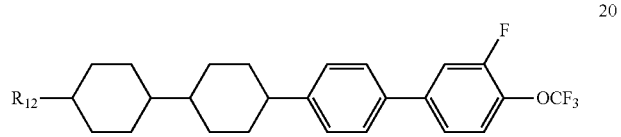

IX-C
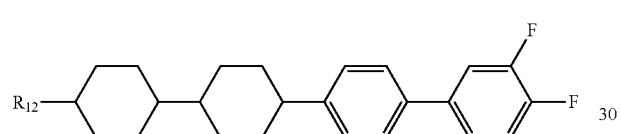

IX-D

IX-E
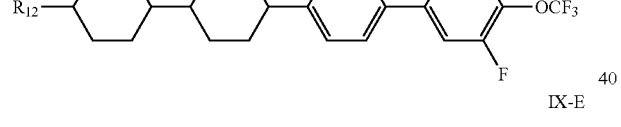

IX-F
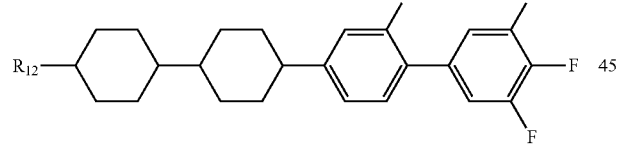

IX-G
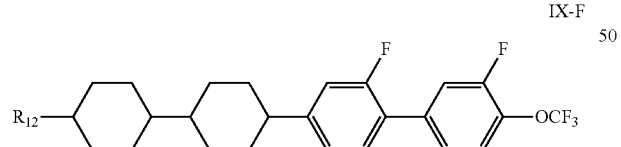

-continued

IX-H
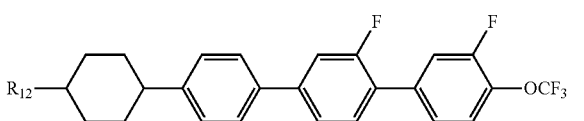

IX-I

IX-J
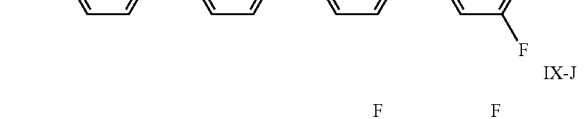

IX-K
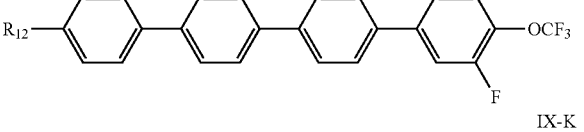

IX-L
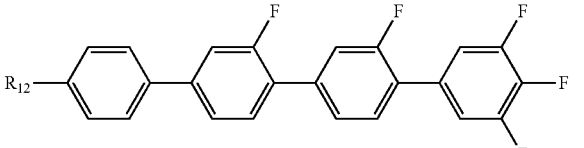

IX-M
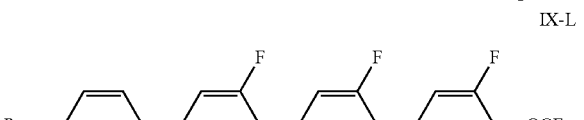

IX-N

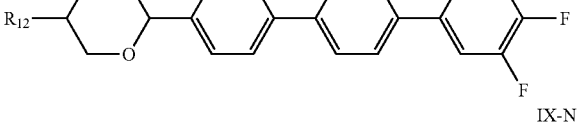

wherein $R_6$ each independently represents a $C_2$-$C_5$ linear alkyl group or linear alkenyl group; $R_7$, $R_8$ and $R_{10}$-$R_{12}$ each independently represent a $C_2$-$C_5$ linear alkyl group; and $R_9$ and $R_x$ each independently represent a $C_1$-$C_5$ linear alkyl group or a $C_2$-$C_5$ linear alkenyl group.

9. The liquid crystal composition of claim 1 included in TN, IPS or FFS mode liquid crystal displays.

\* \* \* \* \*